(12) United States Patent
Priyadarshi et al.

(10) Patent No.: US 10,877,768 B1
(45) Date of Patent: Dec. 29, 2020

(54) MINIMIZING TRAVERSAL OF A PROCESSOR REORDER BUFFER (ROB) FOR REGISTER RENAME MAP TABLE (RMT) STATE RECOVERY FOR INTERRUPTED INSTRUCTION RECOVERY IN A PROCESSOR

(71) Applicant: Microsoft Technology Licensing, LLC, Redmond, WA (US)

(72) Inventors: Shivam Priyadarshi, Morrisville, NC (US); Yusuf Cagatay Tekmen, Raleigh, NC (US); Kiran Ravi Seth, Morrisville, NC (US); Rodney Wayne Smith, Raleigh, NC (US); Vignyan Reddy Kothinti Naresh, Morrisville, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/562,591

(22) Filed: Sep. 6, 2019

(51) Int. Cl.
    *G06F 9/38* (2018.01)
(52) U.S. Cl.
    CPC .......... *G06F 9/3861* (2013.01); *G06F 9/384* (2013.01); *G06F 9/3855* (2013.01)
(58) Field of Classification Search
    CPC ....... G06F 9/3861; G06F 9/3855; G06F 9/384
    See application file for complete search history.

(56) References Cited

U.S. PATENT DOCUMENTS

| 5,546,554 | A | * | 8/1996 | Yung | G06F 9/3836 711/203 |
| 5,721,857 | A | * | 2/1998 | Glew | G06F 9/3834 712/23 |
| 5,794,024 | A | | 8/1998 | Golla et al. | |
| 5,978,900 | A | * | 11/1999 | Liu | G06F 9/30101 711/208 |

(Continued)

FOREIGN PATENT DOCUMENTS

WO    9625705 A1    8/1996

OTHER PUBLICATIONS

"International Search Report and Written Opinion Issued in PCT Application No. PCT/US20/038027", dated Sep. 29, 2020, 14 Pages.

*Primary Examiner* — Farley Abad
(74) *Attorney, Agent, or Firm* — Withrow & Terranova, P.L.L.C.

(57) ABSTRACT

Minimizing traversal of a processor reorder buffer (ROB) for register rename map table (RMT) state recovery for interrupted instruction recovery in a processor. Instructions may execute out of order in a processor. Information about the logical register-to-physical register mapping resulting from each instruction is stored in entries in program order in the ROB. When the pipeline is interrupted by an instruction that fails to execute, changing program flow, all instructions following the interrupting instruction may be flushed from the processor pipeline. It is important to return the state of the RMT to the state that existed when the interrupting instruction entered the pipeline. To recover the RMT state in (Continued)

response to an interrupting instruction, register mapping information in the ROB entries is traversed to either undo the younger instructions that entered the pipeline after the interrupting instruction or replay the older instructions that entered the pipeline before the interrupting instruction.

26 Claims, 10 Drawing Sheets

(56) References Cited

U.S. PATENT DOCUMENTS

| | | | | |
|---|---|---|---|---|
| 6,119,223 | A * | 9/2000 | Witt | G06F 9/30105 |
| | | | | 712/244 |
| 7,506,139 | B2 * | 3/2009 | Burky | G06F 9/3838 |
| | | | | 712/217 |
| 2002/0144090 | A1 | 10/2002 | Ronen et al. | |
| 2010/0274961 | A1 * | 10/2010 | Golla | G06F 9/3855 |
| | | | | 711/108 |
| 2013/0179665 | A1 * | 7/2013 | Jackson | G06F 9/3857 |
| | | | | 712/228 |
| 2014/0281393 | A1 | 9/2014 | Iyengar et al. | |
| 2015/0019843 | A1 * | 1/2015 | Krishna | G06F 9/3855 |
| | | | | 712/217 |
| 2017/0075692 | A1 * | 3/2017 | Kothinti Naresh | G06F 9/3861 |
| 2017/0277535 | A1 * | 9/2017 | Le | G06F 9/3859 |
| 2020/0097296 | A1 * | 3/2020 | Priyadarshi | G06F 9/3857 |
| 2020/0174796 | A1 * | 6/2020 | Swanson | G06F 9/3861 |

* cited by examiner

400

RMT (122)

| LOG | PHY | IDX | RCVR |
|-----|-----|-----|------|
| R0  | 1   | X   |      |
| R1  | 12  | E   | R    |
| R2  | 9   | H   | R    |
| R3  | 0   | X   |      |
| R4  | 8   | G   | R    |
| R5  | 7   | X   |      |
|     | -   | -   |      |
|     | -   | -   |      |

ROB (136)

| IDX | LOG | P_NEW | P_OLD |
|-----|-----|-------|-------|
| A   | -   | -     | -     |
| B ← RD_PTR | 2 | 4 | 2 |
| C   | 2   | 5     | 4     |
| D ← TR_PTR | 4 | 11 | 3 |
| E ← OF_PTR | 1 | 12 | 6 |
| F   | 2   | 14    | 5     |
| G   | 4   | 8     | 11    |
| H ← WR_PTR | 2 | 9 | 14 |
| I   | -   | -     | -     |

CMT (140)

| LOG | PHY |
|-----|-----|
| R0  | 1   |
| R1  | 6   |
| R2  | 2   |
| R3  | 0   |
| R4  | 3   |
| R5  | 7   |

402

RMT (122)

| LOG | PHY | IDX | RCVR |
|-----|-----|-----|------|
| R0  | 1   | X   |      |
| R1  | 12  | E   | R    |
| R2  | 9   | H   | R    |
| R3  | 0   | X   |      |
| R4  | 11  | G   |      |
| R5  | 7   | A   |      |
|     | -   | -   |      |
|     | -   | -   |      |

ROB (136)

| IDX | LOG | P_NEW | P_OLD |
|-----|-----|-------|-------|
| A   | -   | -     | -     |
| B ← RD_PTR | 2 | 4 | 2 |
| C ← TR_PTR | 2 | 5 | 4 |
| D   | 4   | 11    | 3     |
| E ← OF_PTR | 1 | 12 | 6 |
| F   | 2   | 14    | 5     |
| G   | 4   | 8     | 7     |
| H ← WR_PTR | 2 | 9 | 14 |
| I   | -   | -     | -     |

CMT (140)

| LOG | PHY |
|-----|-----|
| R0  | 1   |
| R1  | 6   |
| R2  | 2   |
| R3  | 0   |
| R4  | 3   |
| R5  | 7   |

| LOG | PHY | IDX | RCVR |
|---|---|---|---|
| R0 | 1 | X | |
| R1 | 12 | E | R |
| R2 | 14 | H | R |
| R3 | 0 | X | |
| R4 | 8 | G | R |
| R5 | 7 | A | |
| | - | - | |
| | - | - | |

RMT
(122)

| IDX | LOG | P_NEW | P_OLD |
|---|---|---|---|
| A | 5 | 7 | 10 |
| B | 2 | 4 | 2 |
| C | 2 | 5 | 4 |
| D | 4 | 11 | 3 |
| E | 1 | 12 | 6 |
| F | 2 | 14 | 5 |
| G | 4 | 8 | 11 |
| H | - | - | - |
| I | - | - | - |

RD_PTR → A
TR_PTR → C
OF_PTR → D
WR_PTR → G

}138

ROB
(136)

| LOG | PHY |
|---|---|
| R0 | 1 |
| R1 | 6 |
| R2 | 2 |
| R3 | 0 |
| R4 | 3 |
| R5 | 7 |

CMT
(140)

500B

| LOG | PHY | IDX | RCVR |
|---|---|---|---|
| R0 | 1 | X | |
| R1 | 12 | E | R |
| R2 | 14 | H | R |
| R3 | 0 | X | |
| R4 | 8 | G | R |
| R5 | 7 | A | |
| | - | - | |
| | - | - | |

RMT
(122)

| IDX | LOG | P_NEW | P_OLD |
|---|---|---|---|
| A | 5 | 7 | 10 |
| B | 2 | 4 | 2 |
| C | 2 | 5 | 4 |
| D | 4 | 11 | 3 |
| E | 1 | 12 | 6 |
| F | 2 | 14 | 5 |
| G | 4 | 8 | 4 |
| H | - | - | - |
| I | - | - | - |

RD_PTR → A
OF_PTR → E
TR_PTR → E
WR_PTR → G

}138

ROB
(136)

| LOG | PHY |
|---|---|
| R0 | 1 |
| R1 | 6 |
| R2 | 2 |
| R3 | 0 |
| R4 | 3 |
| R5 | 7 |

CMT
(140)

FIG. 5

MINIMIZING TRAVERSAL OF A PROCESSOR REORDER BUFFER (ROB) FOR REGISTER RENAME MAP TABLE (RMT) STATE RECOVERY FOR INTERRUPTED INSTRUCTION RECOVERY IN A PROCESSOR

FIELD OF THE DISCLOSURE

The technology of the disclosure relates to instruction processing in an instruction pipeline in a computer processor ("processors") and, more particularly, to recovering a state of an instruction pipeline in a processor after an instruction speculative misprediction of a conditional control (e.g., branch) instruction.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions" to perform operations on data and generate a result. A data result generated by a producer instruction of an instruction sequence may be an interim data stored for use by a consumer instruction. To avoid delays that would be caused by storing the interim data to an external memory and then reading the interim data back from external memory into the processor, the interim data can be stored in a register within the processor. The consumer instruction can name the register as an input operand to consume produced data stored in the register.

Instruction set architectures (ISAs) make a certain number of registers available to be used as operands in instructions. However, it is generally desired to provide more registers to store interim data than the number of registers in the ISA, since there may not be enough registers available in the ISA to avoid multiple instructions in the instruction pipeline naming the same register. In this regard, processors employ a greater number of physical registers than specified in an ISA for storing interim data. Thus, the registers available in the ISA are logical registers so that the processor can assign more than one physical register to a logical register. The processor maps the logical registers in processed instructions to the physical registers via a register map table to indicate the actual physical register where the data is stored. The processor includes a register renaming circuit in the instruction pipeline to rename logical registers to physical registers for accessing data in a physical register for execution of the instruction. A logical register-to-physical register mapping in the register map table is freed up when the physical register is obsolete, complete and no longer in-use. Obsolete means a newer write to the same logical register has committed. Complete means the result corresponding to the physical register has been written into the physical register file. No longer in-use means that all instructions that need to consume the physical register are past the point of reading the register file. The processor stores renaming information associated with each instruction in program order in the reorder buffer (ROB), and keeps the latest rename state in the register map table. Once an executed instruction is committed, logical register-to-physical register renaming of the instruction is saved to the committed map table (CMT).

Control hazards can occur in an instruction pipeline where the next instruction in the instruction pipeline cannot be executed without leading to incorrect computation results. For example, a control hazard may occur as a result of execution of a control flow instruction that causes a precise interrupt in the processor. One example of a control flow instruction that can cause a control hazard is a conditional branch instruction. A conditional branch instruction may redirect the flow path of instruction execution based on a condition evaluated when the condition of the control branch instruction is executed. As a result, the processor may have to stall the fetching of additional instructions until a conditional branch instruction has executed, resulting in reduced processor performance and increased power consumption. One approach for maximizing processor performance involves utilizing a prediction circuit to speculatively predict the result of a condition of a conditional branch instruction. However, a mispredicted branch instruction causes a misprediction recovery process to have to be performed, whereby the instruction pipeline is flushed and the instruction pipeline fetch unit is redirected to fetch new instructions starting from the address of the conditional branch instruction. As part of this misprediction recovery process, the register map table that contains register mapping information for uncommitted instructions in the instruction pipeline has to be returned to its previous state of register mapping before the instructions in the correct branch are processed. Because the reorder buffer keeps the latest register rename states in the register map table for uncommitted instructions, the instruction entries containing the latest register rename states in the reorder buffer can be used to restore the previous state of register mapping that executed prior to the instruction that was speculatively mispredicted. It is desirable to restore the register states in the processor in misprediction recovery as quickly as possible to minimize performance losses due to speculative mispredictions.

SUMMARY

Exemplary aspects disclosed herein include minimizing traversal of a processor reorder buffer (ROB) for register rename map table (RMT) state recovery for interrupted instruction recovery in a processor. Although instructions may execute out of order in a pipelined processor, the final result of each instruction on the processor state must be committed in program order. As instructions are processed, the instructions that have a register operand gain access to a logical register designated by the processor's instruction set architecture (ISA). To avoid interference between instructions, logical registers for different instructions must be mapped to unique physical registers. The RMT is updated as each new instruction enters the pipeline and maintains a most recent logical register-to-physical register mapping for each logical register of the processor. Information about the logical register-to-physical register mapping resulting from each instruction is stored in entries in program order in the ROB. When the pipeline is interrupted by an instruction that fails to execute as intended, changing program flow, all instructions following the interrupting instruction may be flushed from the processor pipeline. It is important to return the state of the RMT to the state that existed when the interrupting instruction entered the pipeline and an entry for the instruction was allocated in the ROB.

In exemplary aspects disclosed herein, to recover the RMT state in response to an interrupting instruction that fails to execute as intended, the register mapping information in the ROB entries is traversed sequentially to either undo the effect of younger instructions that entered the pipeline after the interrupting instruction or replay the effect of older instructions that entered the pipeline before the interrupting instruction. During traversal, logical register-to-physical register mapping information obtained from the ROB entries is used to restore the RMT state. To minimize the traversal time of the entries in the ROB to recover the RMT state, in certain aspects disclosed herein, a register rename recover circuit (RRRC) is provided that is configured to determine a position of an oldest flushed instruction entry allocated for the oldest flushed instruction in the ROB and traverse the ROB in a direction from the position of the oldest flushed instruction entry. By traversing the ROB from the oldest flushed instruction, it may be possible to avoid traversing either all of the surviving instruction entries in the ROB or all the flushed instruction entries in the ROB.

In some embodiments, the RRRC is configured to dynamically determine a traversing direction to minimize traversing of the entries in the ROB by minimizing the ROB entries to be traversed to recover the RMT state. For example, it may be possible to traverse fewer ROB entries in a first direction by undoing younger instructions entering the pipeline after the interrupting instruction than in an opposite direction by replaying older instructions entering the pipeline before the interrupting instruction, or vice versa. In other aspects, the RRRC traverses the ROB entries in the ROB in a direction from the instruction entry of the ROB for the oldest flushed instruction entry to the instruction entry for the oldest uncommitted instruction in the ROB. By traversing from the oldest flushed instruction entry, it may be possible to recover the state of logical register to physical register mapping for logical registers in the RMT and make them available to the processor more quickly. In other aspects, the RRRC is configured to traverse the ROB entries in the ROB in a direction from the instruction entry of the oldest flushed instruction to the entry for the youngest uncommitted instruction in the ROB. By traversing in this direction, only the flushed instructions are traversed, and all updates to the RMT are addressed.

In yet other aspects, the RRRC is configured to dynamically determine whether to traverse the ROB entries in the first direction from the instruction entry of the oldest flushed instruction entry to the instruction entry for the oldest uncommitted instruction or in the second direction from the oldest flushed instruction entry instruction to the entry for the youngest uncommitted instruction. By dynamically determining a direction of traversal, the traversal may be minimized. In yet other aspects, the RRRC is configured to traverse the ROB entries in the ROB in the first direction from the instruction entry of the oldest flushed instruction entry to the instruction entry for the oldest uncommitted instruction and in the second direction from the oldest flushed instruction entry instruction to the entry for the youngest uncommitted instruction in parallel. By traversing in both directions, through surviving entries and flushed entries, simultaneously, the traversing time is minimized and the RMT recovery is expedited. Those skilled in the art will appreciate the scope of the present disclosure and realize additional aspects thereof after reading the following detailed description of the preferred embodiments in association with the accompanying drawing figures.

An exemplary embodiment of a register renaming recover circuit (RRRC) in a processor is disclosed herein. The RRRC is configured to receive a flush indicator indicating a flush of one or more instructions in the processor based on an interrupting instruction that caused the flush of the one or more instructions in the processor, and receive an interrupting instruction indicator indicating a position of an interrupting instruction entry allocated to the interrupting instruction in a reorder buffer in the processor. The RRRC is further configured to determine a position of an oldest flushed instruction entry allocated for an oldest instruction of the one or more instructions indicated to flush based on the interrupting instruction indicator; and traverse the reorder buffer in the processor in a first direction from the position of the oldest flushed instruction entry. To traverse the reorder buffer, the RRRC is configured to determine if a first instruction allocated to a first instruction entry in the reorder buffer in the first direction resulted in a logical register-to-physical register mapping in a map entry of a register mapping table in the processor, and in response to determining the first instruction allocated to the first instruction entry in the reorder buffer in the first direction resulted in a logical register-to-physical register mapping in a map entry of the register mapping table in the processor, recover the logical register-to-physical register mapping of the map entry in the register mapping table to a previous logical register-to-physical register mapping prior to the oldest instruction of the one or more instructions indicated to flush.

In another embodiment, a method in a register rename recover circuit is disclosed. The method includes receiving a flush indicator indicating a flush of one or more instructions in the processor based on an interrupting instruction that caused the flush of the one or more instructions in the processor, and receiving an interrupting instruction indicator indicating a position of an interrupting instruction entry allocated to the interrupting instruction in a reorder buffer in the processor. The method further includes determining a position of an oldest flushed instruction entry allocated for an oldest instruction of the one or more instructions indicated to flush based on the interrupting instruction indicator, and traversing the reorder buffer in the processor in a first direction from the position of the oldest flushed instruction entry. Traversing the reorder buffer further comprises determining if a first instruction allocated to a first instruction entry in the reorder buffer in the first direction resulted in a logical register-to-physical register mapping in a map entry of a register mapping table in the processor, and in response to determining that the first instruction allocated for the first instruction entry in the reorder buffer in the first direction resulted in a logical register-to-physical register mapping in a map entry of the register mapping table in the processor, recovering the logical register-to-physical register mapping of the map entry in the register mapping table to a previous logical register-to-physical register mapping prior to the oldest instruction of the one or more instructions indicated to flush.

In another exemplary embodiment, a register renaming recover circuit in a processor is disclosed. The register renaming recover circuit is configured to receive a flush indicator indicating a flush of one or more instructions in the processor based on an interrupting instruction that caused the flush of the one or more instructions in the processor, and receive an interrupting instruction indicator indicating a position of an interrupting instruction entry allocated to the interrupting instruction in a reorder buffer in the processor. The register renaming recover circuit is further configured to determine a position of an oldest flushed instruction entry allocated for an oldest instruction of the one or more instructions indicated to flush based on the interrupting instruction indicator, and determine if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction. The register renaming recover circuit is configured to, in response to determining that the number of survivor instruction entries is less than the number of flushed instruction entries, traverse the reorder buffer in the processor in a first direction from the oldest instruction entry to the instruction entry allocated to the next older instruction than the oldest instruction of the one or more instructions indicated to flush. In response to determining that the number of survivor instruction entries is not less than the number of flushed instruction entries, the register renaming recover circuit is configured to traverse the reorder buffer in the processor in the first direction from the youngest instruction entry to the oldest flushed instruction entry.

In another exemplary aspect, a method in a register renaming recover circuit is disclosed, wherein the method includes receiving a flush indicator indicating a flush of one or more instructions in the processor based on an interrupting instruction that caused the flush of the one or more instructions in the processor, and receiving an interrupting instruction indicator indicating a position of an interrupting instruction entry allocated to the interrupting instruction in a reorder buffer in the processor. The method further includes determining a position of an oldest flushed instruction entry allocated for an oldest instruction of the one or more instructions indicated to flush based on the interrupting instruction indicator, and determining if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction. The method further includes, in response to determining that the number of survivor instruction entries is less than the number of flushed instruction entries, traversing the reorder buffer in the processor in a first direction from the oldest instruction entry to the instruction entry allocated to the next older instruction than the oldest instruction of the one or more instructions indicated to flush. The method still further includes, in response to determining that the number of survivor instruction entries is not less than the number of flushed instruction entries, traversing the reorder buffer in the processor in the first direction from the youngest instruction entry to the oldest flushed instruction entry.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary instruction processing circuit that includes one or more instruction pipelines for processing computer instructions for execution, wherein the instruction processing circuit includes a control flow prediction circuit configured to speculatively predict conditions of conditional flow control instructions fetched and processed by the instruction processing circuit;

FIGS. 4A and 4B illustrate an exemplary sequence of traversing entries in the ROB in the instruction processing circuit of FIG. 1 to recover a previous state of the RMT existing when an interrupting instruction, which is to be flushed, entered the processor;

FIG. 5 illustrates two exemplary states of the ROB in the instruction processing circuit of FIG. 1 in response to a flush indication to recover the RMT to a previous state in cases in which the interrupting instruction is flushed;

DETAILED DESCRIPTION

Figure 1:
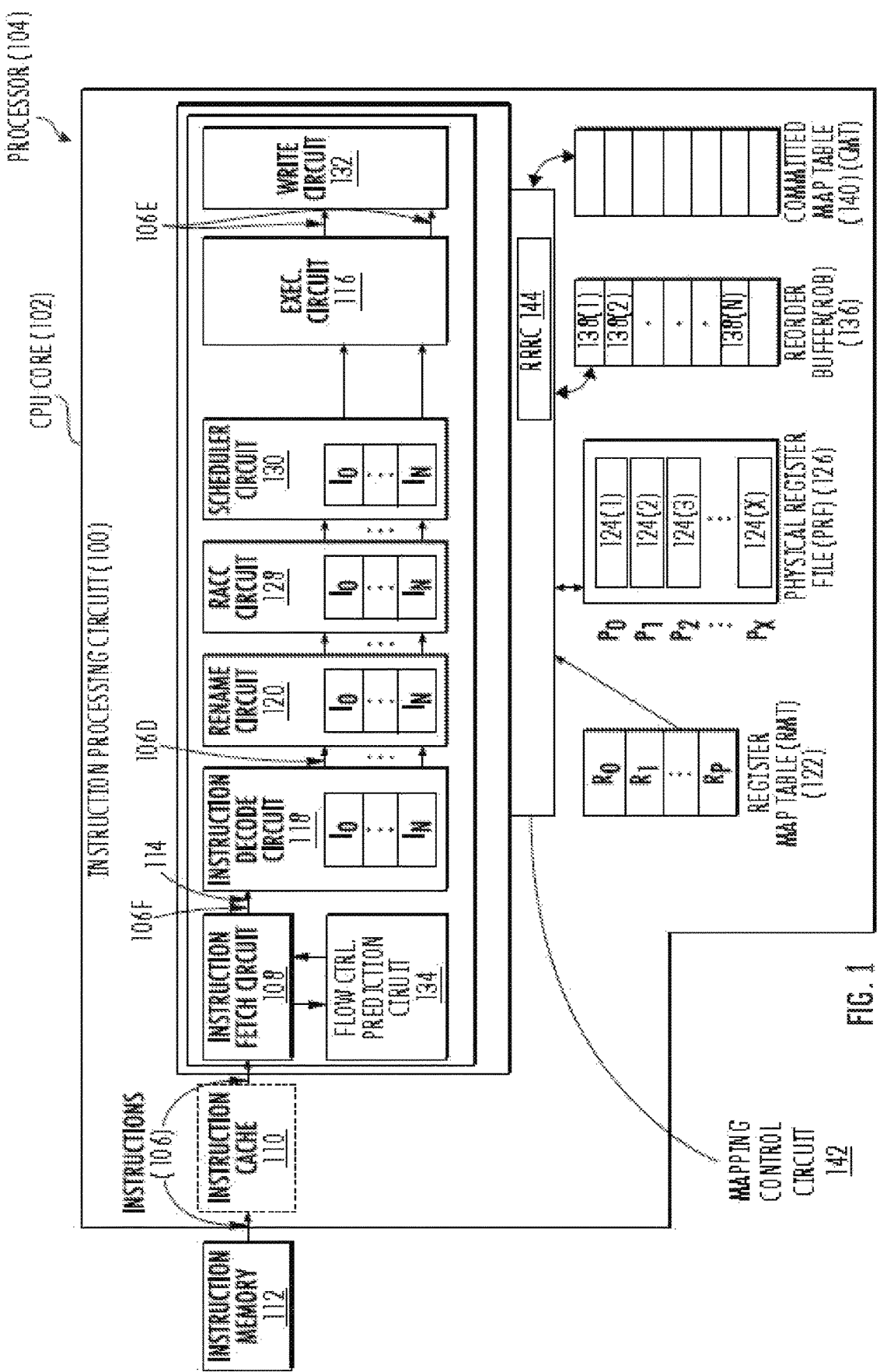

Exemplary aspects disclosed herein include minimizing traversal of a processor reorder buffer (ROB) for register rename map table (RMT) state recovery for interrupted instruction recovery in a processor. Although instructions may execute out of order in a pipelined processor, the final result of each instruction on the processor state must be committed in program order. As instructions are processed, the instructions that have a register operand gain access to a logical register designated by the processor's instruction set architecture (ISA). To avoid interference between instructions, logical registers for different instructions must be mapped to unique physical registers. The RMT is updated as each new instruction enters the pipeline and maintains a most recent logical register-to-physical register mapping for each logical register of the processor. Information about the logical register-to-physical register mapping resulting from each instruction is stored in entries in program order in the ROB. When the pipeline is interrupted by an instruction that fails to execute as intended, changing program flow, all instructions following the interrupting instruction may be flushed from the processor pipeline. It is important to return the state of the RMT to the state that existed when the interrupting instruction entered the pipeline and an entry for the instruction was allocated in the ROB.

In exemplary aspects disclosed herein, to recover the RMT state in response to an interrupting instruction that fails to execute as intended, the register mapping information in the ROB entries is traversed sequentially to either undo the effect of younger instructions that entered the pipeline after the interrupting instruction or replay the effect of older instructions that entered the pipeline before the interrupting instruction. During traversal, logical register-to-physical register mapping information obtained from the ROB entries is used to restore the RMT state. To minimize the traversal time of the entries in the ROB to recover the RMT state, in certain aspects disclosed herein, a register rename recover circuit (RRRC) is provided that is configured to determine a position of an oldest flushed instruction entry allocated for the oldest flushed instruction in the ROB and traverse the ROB in a direction from the position of the oldest flushed instruction entry. By traversing the ROB from the oldest flushed instruction, it may be possible to avoid traversing either all of the surviving instruction entries in the ROB or all the flushed instruction entries in the ROB.

In some embodiments, the RRRC is configured to dynamically determine a traversing direction to minimize traversing of the entries in the ROB by minimizing the ROB entries to be traversed to recover the RMT state. For example, it may be possible to traverse fewer ROB entries in a first direction by undoing younger instructions entering the pipeline after the interrupting instruction than in an opposite direction by replaying older instructions entering the pipeline before the interrupting instruction, or vice versa. In other aspects, the RRRC traverses the ROB entries in the ROB in a direction from the instruction entry of the ROB for the oldest flushed instruction entry to the instruction entry for the oldest uncommitted instruction in the ROB. By traversing from the oldest flushed instruction entry, it may be possible to recover the state of logical register to physical register mapping for logical registers in the RMT and make them available to the processor more quickly. In other aspects, the RRRC is configured to traverse the ROB entries in the ROB in a direction from the instruction entry of the oldest flushed instruction to the entry for the youngest uncommitted instruction in the ROB. By traversing in this direction, only the flushed instructions are traversed, and all updates to the RMT are addressed.

In yet other aspects, the RRRC is configured to dynamically determine whether to traverse the ROB entries in the first direction from the instruction entry of the oldest flushed instruction entry to the instruction entry for the oldest uncommitted instruction or in the second direction from the oldest flushed instruction entry instruction to the entry for the youngest uncommitted instruction. By dynamically determining a direction of traversal, the traversal may be minimized. In yet other aspects, the RRRC is configured to traverse the ROB entries in the ROB in the first direction from the instruction entry of the oldest flushed instruction entry to the instruction entry for the oldest uncommitted instruction and in the second direction from the oldest flushed instruction entry instruction to the entry for the youngest uncommitted instruction in parallel. By traversing in both directions, through surviving entries and flushed entries, simultaneously, the traversing time is minimized and the RMT recovery is expedited. Those skilled in the art will appreciate the scope of the present disclosure and realize additional aspects thereof after reading the following detailed description of the preferred embodiments in association with the accompanying drawing figures.

FIG. 1 illustrates an instruction processing circuit 100 that is provided in a CPU core 102 in a processor 104 in FIG. 1. The instruction processing circuit 100 includes one or more instruction pipelines $I_0$-$I_N$ for processing fetched computer instructions 106F fetched by an instruction fetch circuit 108 for execution from a series of instructions 106 stored in an instruction cache memory 110 or instruction memory 112, as examples. The instruction fetch circuit 108 is configured to provide fetched instructions 106F into the one or more instruction pipelines $I_0$-$I_N$ as an instruction stream 114 in the instruction processing circuit 100 to be pre-processed before the fetched instructions 106F reach an execution circuit 116 to be executed. The instruction pipelines $I_0$-$I_N$ are provided across different processing circuits or stages of the instruction processing circuit 100 to pre-process and process the fetched instructions 106F in a series of steps that can be performed concurrently to increase throughput prior to execution of the fetched instructions 106F by the execution circuit 116.

With continuing reference to FIG. 1, the instruction processing circuit 100 includes an instruction decode circuit 118 configured to decode the fetched instructions 106F fetched by the instruction fetch circuit 108 into decoded instructions 106D to determine the instruction type and actions required. The decoded instructions 106D are placed in one or more of the instruction pipelines $I_0$-$I_N$ and are next provided to a rename circuit 120 in the instruction processing circuit 100 to determine if any register names in the decoded instructions 106D need to be renamed to break any register dependencies that would prevent parallel or out-of-order processing. The rename circuit 120 is configured to call upon a RMT 122 to rename a logical source register operand and/or write a destination register operand of a decoded instruction 106D to available physical registers 124(1)-124(X) ($P_0$, $P_1$, . . . , $P_X$) in a physical register file (PRF) 126. The RMT 122 contains a plurality of mapping entries each mapped to (i.e., associated with) a respective logical register $R_0$-$R_P$. The mapping entries are configured to store information in the form of an address pointer to point to a physical register 124(1)-124(X) in the PRF 126. Each physical register 124(1)-124(X) in the PRF 126 is configured to store a data entry for the source and/or destination register operand of a decoded instruction 106D.

The instruction processing circuit 100 also includes a register access (RACC) circuit 128 configured to access a physical register 124(1)-124(X) in the PRF 126 based on a mapping entry mapped to a logical register $R_0$-$R_P$ in the RMT 122 of a source register operand of a decoded instruction 106D to retrieve a produced value from an executed instruction 106E in the execution circuit 116. Also, in the instruction processing circuit 100, a scheduler circuit 130 is provided in the instruction pipelines $I_0$-$I_N$ and is configured to store decoded instructions 106D in reservation entries until all source register operands for the decoded instructions 106D are available. A write circuit 132 is also provided in the instruction processing circuit 100 to write back or commit produced values from executed instructions 106E to memory, such as the PRF 126, a cache memory system (not shown) or a main memory (not shown).

With continuing reference to FIG. 1, the instruction processing circuit 100 also includes a flow control prediction circuit 134. The flow control prediction circuit 134 is configured to speculatively predict the outcome of a condition of a fetched conditional flow control instruction 106F, such as a conditional branch instruction, that controls whether the taken or not taken path in the instruction control flow path of the instruction stream 114 is fetched into the instruction pipelines $I_0$-$I_N$ for execution. In this manner, the condition of the fetched conditional flow control instruction 106F does not have to be resolved in execution by the execution circuit 116 before the instruction processing circuit 100 can continue processing speculatively fetched instructions 106F. The prediction made by the flow control prediction circuit 134 can be provided as prediction information 136 to the instruction fetch circuit 108 to be used by the instruction fetch circuit 108 to determine the next instructions 106 to fetch.

However, if the condition of the conditional flow control instruction 106F is determined to have been mispredicted when the conditional flow control instruction 106F is executed in the execution circuit 116, the instruction 106F is interrupted. The speculatively fetched instructions 106F that were processed in the instruction processing circuit 100 after the conditional flow control instruction 106F are flushed because the direction of program flow is changed and will not include processing of these instructions. Load or store instructions 106F for which a calculated address of a memory location may be invalid or cannot be accessed for some other reason can also cause a flush of subsequent instructions 106F. The program flow of the instruction processing circuit 100 is interrupted under these conditions, and the instruction processing circuit 100 is returned to a previous state. The previous state to which the processor is restored depends on the type of interrupted instruction and may be a state that existed either prior to or as a result of the instruction 106F that is interrupted ("interrupting instruction"). In particular, the present disclosure is directed to recovering the previous state of the RMT 122 to restore logical register-to-physical register mappings that have been changed by instructions that entered the instruction processing circuit 100 after the interrupting instruction 106 ("younger instructions").

With continuing reference to FIG. 1, the instruction processing circuit 100 also includes a ROB 136 containing entries ("ROB entries") 138 allocated to each instruction 106 that is being processed by the instruction processing circuit 100 but has not been committed. A ROB index identifies the position of each ROB entry 138 in the ROB 136. The ROB entries 138 are allocated sequentially in program order to instructions 106. The ROB index for each instruction 106 is reported back to the instruction processing circuit 100 when the ROB entry 138 is initially allocated. In this way, the instruction processing circuit 100 can associate a ROB index to the interrupting instruction. Information about changes to the mapping of the logical registers $R_0$-$R_P$ as a result of an instruction 106 is stored in the ROB entry 138 corresponding to the instruction 106. The ROB 136 includes a Read Pointer RD_PTR pointing to the ROB index of the ROB entry 138 from which information about the oldest uncommitted instruction 106 is read when it is committed. The Read Pointer RD_PTR is updated each time an uncommitted instruction 106 is committed. The ROB 136 also includes a Write Pointer WR_PTR indicating the ROB index of the last ROB entry 138 to which information is written about the youngest uncommitted instruction 106. When an instruction 106 updates a logical register-to-physical register mapping of a logical register $R_0$-$R_P$ in the RMT 122, the ROB index of a ROB entry 138 of the instruction 106 is associated with that logical register $R_0$-$R_P$. Therefore, the ROB index corresponding to the last instruction 106 that updated the mapping of a logical register $R_0$-$R_P$ is stored in the RMT 122 with the entry for the logical register $R_0$-$R_P$. As will be explained in detail below, the information stored for uncommitted instructions 106 in ROB entries 138 is used to achieve RMT recovery in response to a flush.

With continuing reference to FIG. 1, the instruction processing circuit 100 also includes a committed map table (CMT) 140 which stores the logical register-to-physical register mapping of each logical register $R_0$-$R_P$ of the processor 104 as a result of committed instructions 106. The CMT 140 is only updated when an instruction 106 is committed. The CMT 140 is not changed by the recovery of the RMT 122 in response to a flush.

The instruction processing circuit 100 also includes a mapping control circuit 142, which includes a register rename recover circuit (RRRC) 144 for controlling the RMT flush recovery. The mapping control circuit 142 is configured to allocate new ROB entries 138 to new instructions 106 entering the pipeline $I_0$-$I_N$ and set the Write Pointer WR_PTR accordingly. Therefore, the ROB entries 138 may also be referred to herein as instruction entries 138. The mapping control circuit 142 also deallocates an entry 138 when an oldest uncommitted instruction 106 is committed. This includes moving the Read Pointer RD_PTR to the next oldest uncommitted instruction. The RRRC 144 will be discussed further with reference to FIG. 2.

Figure 2:
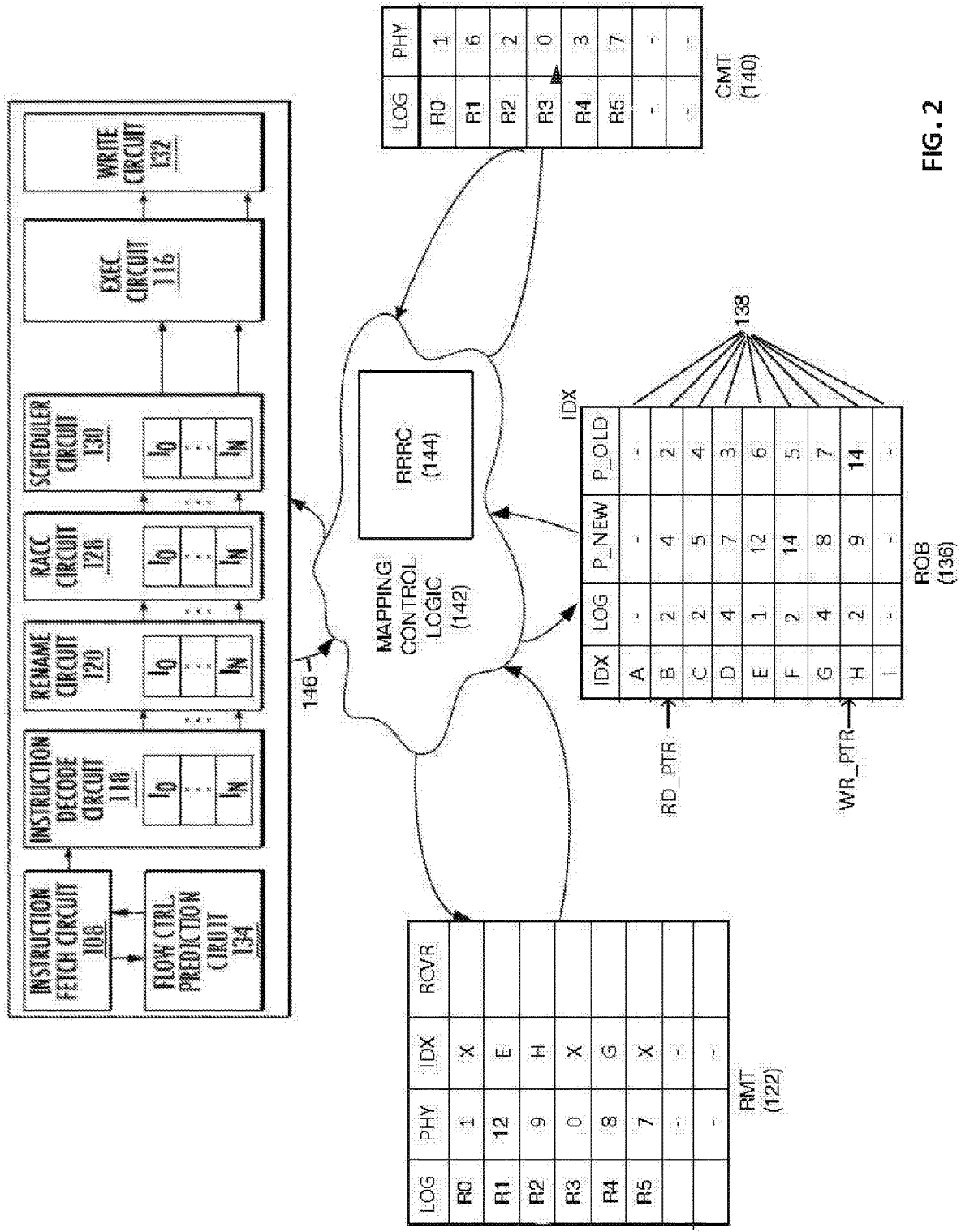
FIG. 2 is a schematic diagram including certain elements of the exemplary instruction processing circuit in FIG. 1 including a register rename map table (RMT), a reorder buffer (ROB), a committed map table (CMT), and a mapping control circuit including a register rename recovery circuit (RRRC) configured to traverse entries of the ROB to recover a state of the RMT in response to a flush indicator.

FIG. 2 is an illustration of components of the instruction processing circuit 100 in FIG. 1, including the RMT 122, the ROB 136, the CMT 140, and the mapping control circuit 142, including the RRRC 144. When a flush occurs due to an interrupting instruction 106, as discussed above, the instruction processing circuit 100 provides a flush indicator 146 indicating a flush of one or more instructions in the instruction processing circuit 100. The instruction processing circuit 100 also provides the ROB index of the ROB entry 138 of the interrupting instruction 106, which may be referred to herein as the "interrupting instruction indicator". The flush indicator 146 and the interrupting instruction indicator are received by the RRRC 144 to control the RMT flush recovery. The interrupting instruction indicator points to the ROB index of the ROB entry 138 of the interrupting instruction 106 that caused the flush. Based on the interrupting instruction indicator, an oldest flushed instruction entry, identified by an oldest flush instruction pointer (OF_PTR) indicates the oldest instruction in the ROB 136 that is to be flushed. In the RMT recovery, the oldest flushed instruction indicated by the oldest flushed instruction entry and any younger instructions will be flushed. The interrupting instruction 106 may be the oldest instruction to be flushed, depending on the instruction type of the interrupting instruction 106. Alternatively, the interrupting instruction 106 may not be flushed, depending on the instruction type. In this case, the interrupting instruction 106 is the youngest surviving instruction. Any logical register-to-physical register mapping changes that resulted from a flushed instruction must be negated (i.e., undone) to restore the RMT 122 to the desired previous state.

With further reference to FIG. 2, an example state of the RMT 122, the ROB 136, and the CMT 140 are shown. The example state shown in FIG. 2 is used as a starting point for the examples of RMT recovery illustrated in FIGS. 3A-3B, 4A-4B, and 5A-5B.

The RMT 122 in FIG. 2 is illustrated as a table including a row for each logical register $R_0$-$R_P$ with logical registers $R_0$-$R_5$ labeled. The column entries in each row indicate, for each of the logical registers $R_0$-$R_5$, a logical register number (LOG), a physical register number (PHY) to which the logical register $R_0$-$R_5$ is mapped, the ROB index (IDX) of the ROB entry 138 of the instruction 106 that resulted in the logical register-to-physical register mapping of the logical register $R_0$-$R_5$, and a recover indication (RCVR) used in the recovery of the RMT 122. The RCVR is described further below.

The ROB 136 is illustrated as a table including a row for each ROB entry 138. The column entries in each row indicate, for each of the ROB entries 138, the ROB index (IDX) of the ROB entry 138, the logical register number (LOG) of the logical register $R_0$-$R_P$ whose mapping was changed by the instruction 106 associated with the ROB entry 138, the new physical register (P_NEW) to which the logical register $R_0$-$R_P$ is mapped, and the old physical register (P_OLD) to which the logical register $R_0$-$R_P$ was previously mapped. In FIG. 2, the ROB 136 is shown with ROB entries 138 having ROB indexes A-I.

The CMT 140 is also illustrated as a table including a row for each logical register $R_0$-$R_P$ with logical registers $R_0$-$R_5$ labeled. Each row has a column entry indicating the logical register number (LOG) and the corresponding physical register (PHY) to which the logical register $R_0$-$R_P$ in the same row is mapped.

The arrowed lines in FIG. 2 show bidirectional flow between the mapping control circuit 142 and each of the RMT 122, the ROB 136, the CMT 140, and the instruction processing circuit 100. The purpose of some of these signals may be described below as needed but generally indicate flow of control signals and/or data to accomplish operations described herein. The instruction processing circuit 100 according to the present disclosure is not limited to the dimensions, contents or labels of the tables shown in FIG. 2. The RMT 122, the ROB 136, and the CMT 140 according to the present disclosure may contain any number of rows, additional columns providing other information for each row, and different names than those illustrated in FIG. 2. The entries of the RCVR column illustrated as being included in the RMT 122 in FIG. 2 may be maintained and/or stored separately from the RMT 122 and still provide the functions disclosed herein.

Information about any logical register-to-physical register mapping of logical registers $R_0$-$R_P$ updated since the last committed instruction is stored in the ROB entries 138 in program order. The logical register-to-physical register mapping of each of the logical registers $R_0$-$R_P$ whose mapping was updated as a result of an instruction 106 to be flushed must be recovered to the state of the mapping that existing at the time of the interrupting instruction 106. Each entry 138 contains information about the logical register mapping change that resulted from the particular instruction 106 to which that ROB entry 138 is allocated. Because the information in an entry 138 includes both the new physical register (P_NEW) and the old physical register (P_OLD) to which a logical register $R_0$-$R_P$ is mapped, the information from the ROB entries 138 can be used to negate ("undo") or recreate ("redo") the logical mapping of any logical register (s) $R_0$-$R_P$ updated since the last committed instruction. Examples of how the ROB entries 138 are traversed by the RRRC 144 for RMT recovery are provided.

All ROB entries 138 having a ROB index from the oldest flushed instruction and younger may have changed the logical register-to-physical register mapping of a logical register $R_0$-$R_P$. Therefore, when a flush indicator 146 is received from the instruction processing circuit 100, the ROB indexes associated with each logical register map in the RMT 122 are compared to the OF_PTR to identify all of the logical registers that were mapped to a new physical register as a result of an instruction that is to be flushed.

Figure 3A:
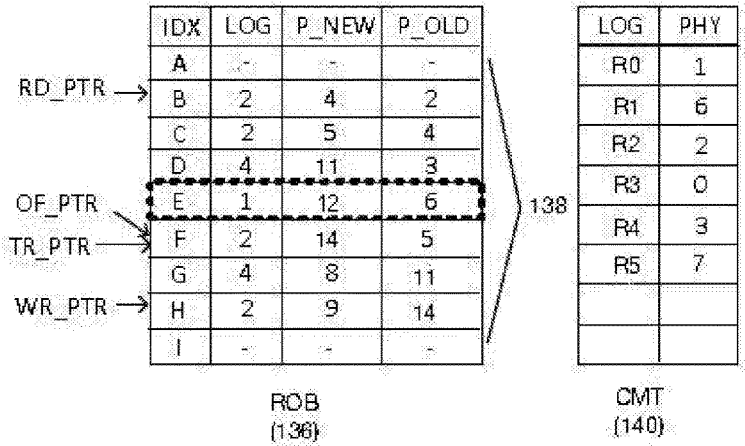
FIGS. 3A and 3B illustrate an exemplary sequence of traversing entries in the ROB in the instruction processing circuit of FIG. 1 to recover a previous state of the RMT existing when an interrupting instruction, which is not to be flushed, entered the instruction processing circuit.
Figure 3A:
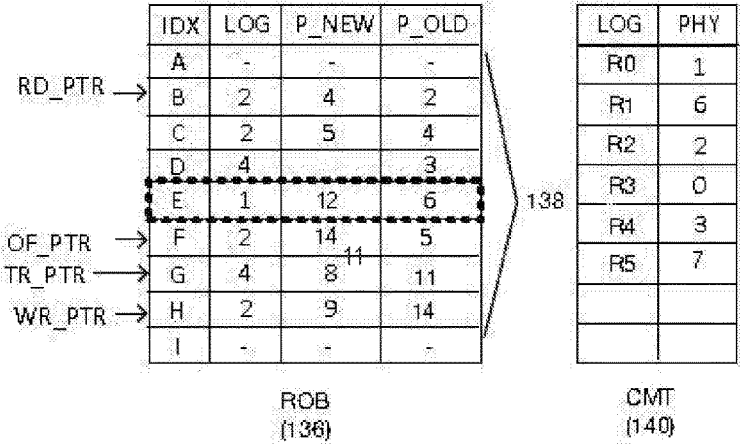
Figure 3B:
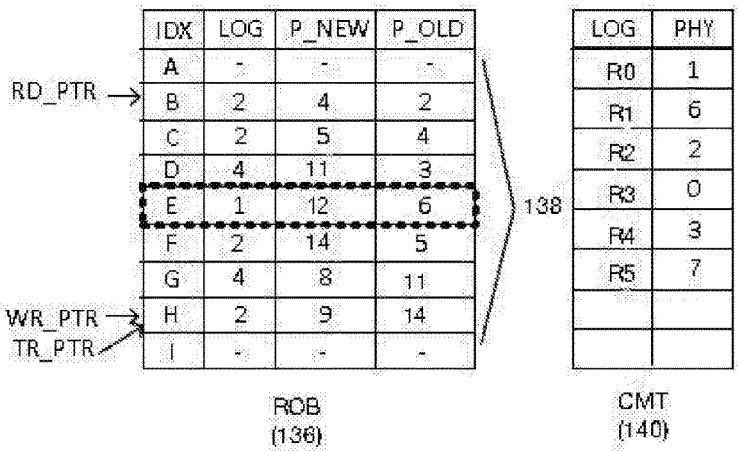
Figure 3B:
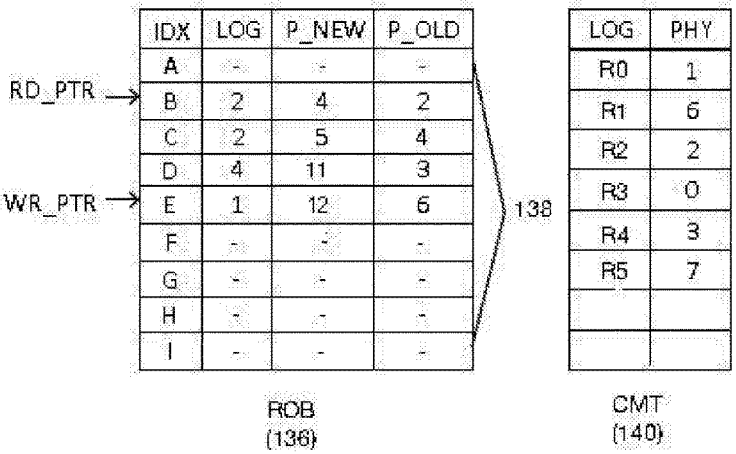

FIGS. 3A and 3B illustrate an exemplary sequence of, in response to a flush indicator 146, traversing the ROB entries 138 in the ROB 136 in the instruction processing circuit 100 of FIG. 1 to recover a previous state of the RMT 122 existing prior to the oldest flushed instruction 106 entering the instruction processing circuit 100. The RRRC 144 obtains information in the ROB entries 138 to recover the RMT 122 from a state existing when the flush indicator 146 is received to a previous state existing at the time the oldest flushed instruction 106 entered the instruction processing circuit 100. The CMT 140 is shown for reference but is unaffected by the recovery process. Respective combined states of the CMT 140, RMT 122, and ROB 136 shown in FIGS. 3A-3B are referred to herein as "processor states" 300-306. Since the RMT recovery according to the circuits and methods disclosed herein do not change the instruction processing circuit 100, it is not shown in these examples.

Beginning with processor state 300, the ROB entry 138 (B) is allocated to the oldest uncommitted instruction, and the ROB entry 138(H) is allocated to the youngest uncommitted instruction. Since none of the instructions to which ROB entries 138 are allocated have been committed, these instructions will be referred to as the oldest and youngest instructions in the ROB 136, respectively. In processor state 300, the RRRC 144 receives a flush indicator 146 indicating a flush of one or more instructions in the processor 104 based on an interrupting instruction 106 that caused the flush of the one or more instructions in the processor 104. The RRRC 144 also receives an interrupting instruction indicator indicating the position of an interrupting instruction entry 138 for the interrupting instruction 106 in the ROB 136 in the processor 104.

The RRRC 144 determines a position of an oldest flushed instruction entry OF_PTR allocated for the oldest instruction of the one or more instruction indicated to be flushed based on the interrupting instruction indicator. The oldest flushed instruction entry OF_PTR is set to point to the oldest flushed instruction. The dotted line highlighting the ROB entry 138(E) is the interrupting instruction 106, which is optionally flushed, depending on the type of interrupting instruction.

A traversal pointer TR_PTR, used to identify a current entry during steps of the RMT recovery, is set to the first ROB entry 138 of the oldest instruction to be flushed. The RRRC 144 traverses the ROB entries 138 in the ROB 136 in the processor 104 in a first direction from the position of the oldest flushed instruction entry OF_PTR. The RRRC 144 traverses the ROB entries 138 in the ROB 136 by determining if a first instruction allocated to the first instruction entry 138 in the ROB 136 in the first direction resulted in a logical register-to-physical register mapping in a map entry of the RMT 122. Since the interrupting instruction 106 is not flushed in this example, the traversal pointer TR_PTR is set to point to the ROB entry 138(F) for the oldest flushed instruction.

The ROB indexes associated with each of the logical registers $R_0$-$R_5$ are compared to the ROB index F because they may have been mapped to new physical registers as a result of a flushed instruction. If any logical registers $R_0$-$R_5$ have an associated ROB index of F or alphabetically following F, a recovery is needed. If none of the ROB indexes associated with logical registers $R_0$-$R_5$ in the RMT 122 have an associated ROB index of F or alphabetically following F, no recovery is needed. Therefore, the RRRC 144 is configured to determine that at least one map entry in the RMT 122 is not recovered based on the ROB index in the at least one map entry in the RMT 122 corresponding to a ROB index of a ROB entry 138 allocated for an instruction after the interrupting instruction entry 138 is allocated for the one or more instructions indicated to be flushed.

In processor state 300, the ROB indexes G and H indicate that mapping of the logical registers $R_2$ and $R_4$ will need to be recovered. In response to determining that at least one map entry in the RMT 122 is not recovered based on an index of an instruction entry 138 in the ROB 136 allocated for the one or more instructions indicated to be flushed, for each of the at least one map entry of the RMT 122, the RRRC 144 is configured to set the recovery indicator RCVR (e.g., to "R" for recover) for logical registers $R_2$ and $R_4$ to indicate that the logical register-to-physical register mapping in the map entry needs to be recovered. Other mechanisms for tracking which of the RMT entries have been recovered or not recovered is within the scope of this disclosure. Referring to the ROB 136, the ROB entries 138 with ROB indexes F and H show that logical register $R_2$ was mapped from old physical register P_OLD 5 to new physical register P_NEW 14 by the instruction associated with ROB index F, and then subsequently mapped to new physical register P_NEW 9 by the instruction associated with ROB index H. In addition, the ROB entry 138 with ROB index G shows that logical register $R_4$ was mapped from old physical register P_OLD 7 to new physical register P_NEW 8.

The RMT recovery in the example shown in FIGS. 3A-3B, is performed by the RRRC 144, which is configured to traverse the ROB entries 138 in the ROB 136 in a first direction from the position of the oldest flushed instruction entry. The RRRC 144 determines the position of the oldest flushed instruction entry, allocated for the oldest instruction of the one or more instructions indicated to be flushed, based on the interrupting instruction indicator, and further based on the type of the interrupting instruction 106. Starting with the ROB entry 138(F), the RRRC 144 determines if a first instruction 106 allocated to the first instruction entry of the ROB 136 in the first direction (i.e., ROB entry 138(F)) resulted in a logical register-to-physical register mapping in a map entry of the RMT 122. As shown, the instruction 106 allocated to the ROB entry 138(F) resulted in a change to the mapping of logical register $R_2$. In response to determining the first instruction 106 allocated to the first instruction entry (ROB entry 138(F)) in the first direction resulted in a logical register-to-physical register mapping in the map entry for logical register $R_2$ in the RMT 122, the RRRC 144 recovers the logical register-to-physical register mapping of the logical register $R_2$ in the RMT 122 to a previous logical register-to-physical register mapping prior to an oldest instruction of the one or more instructions indicated to be flushed.

Moving to processor state 302 in FIG. 3A, the logical register-to-physical register mapping of logical register $R_2$ in the RMT 122 is recovered to physical register 5, based on the old physical register P_OLD value in ROB entry 138(F), which is the state after the interrupting instruction 106 completed. In response to recovering the logical register-to-physical register mapping of the map entry in the RMT 122 to the previous logical register-to-physical register mapping prior to the oldest instruction of the one or more instructions indicated to be flushed, the RRRC 144 sets the recovery indicator RCVR for the map entry for which the logical register-to-physical register mapping is recovered to indicate that the logical register-to-physical register mapping in the recovered map entry is recovered. Thus, the RCVR associated with the logical register $R_2$ is set to indicate that the logical register $R_2$ is recovered, which further indicates to the instruction processing circuit 100 that logical register $R_2$ in the RMT 122 is available for use as the program flow proceeds in a new direction following the interrupt.

Since recovery of logical register $R_2$ based on information in the ROB entry 138(F) is complete, the traversal pointer TR_PTR is set to point to the ROB entry 138(G). The RRRC 144 will determine if a second instruction, allocated for a second ROB entry 138 in the ROB 136 in the first direction, resulted in a logical register-to-physical register mapping in a map entry of a logical register $R_0$-$R_5$ in the RMT 122. In response to such determination, the RRRC 144 determines if the recovery indicator RCVR for the map entry of the logical register $R_0$-$R_5$ in the RMT 122 indicates that the logical register-to-physical register mapping in the map entry is not recovered. In response to determining such map entry is not recovered, the RRRC 144 recovers the logical register-to-physical register mapping of the map entry for the logical register $R_0$-$R_5$ in the RMT 122 to the previous logical register-to-physical register mapping prior to the oldest instruction of the one or more instructions indicated to be flushed, and sets the recovery indicator RCVR to indicate that the logical register-to-physical register mapping in the map entry is recovered.

In the example in FIG. 3A, the RRRC 144 determines that the instruction allocated to ROB entry 138(G) resulted in a change to the logical register-to-physical register mapping of logical register $R_4$ in the RMT 122. In response, the RRRC 144 determines whether the recovery indicator RCVR for logical register $R_4$ in the RMT 122 indicates that the mapping for logical register $R_4$ needs to be recovered. As shown in processor state 302, the RRRC 144 determines that the recovery indicator RCVR for logical register $R_4$ indicates that the mapping for logical register $R_4$ needs to be recovered, so the RRRC 144 recovers the state of the map entry of logical register $R_4$ in the RMT 122 based on the information in ROB entry 138(G). Specifically, the logical register-to-physical register mapping of logical register $R_4$ is set to map logical register $R_4$ to physical register 11 based on the old physical register P_OLD value in ROB entry 138(G), which is the state of the mapping of logical register $R_4$ after the interrupting instruction caused a change to the RMT 122. This mapping recovery of logical register $R_4$ is shown in the RMT 122 in processor state 304 in FIG. 3B.

With reference to processor state 304 in FIG. 3B, the recovery indicator RCVR for logical register $R_4$ is set to indicate that the logical register-to-physical register mapping for logical register (4) in the RMT 122 is recovered. The traversal pointer TR_PTR is also moved to point to the next ROB entry 138(H) in the first direction of traversal. The RRRC 144 determines if an instruction 106 allocated to the ROB entry 138(H) resulted in a logical register-to-physical register mapping of a logical register $R_0$-$R_5$ in the RMT 122 and, if so, determines if the recovery indicator RCVR corresponding to the logical register $R_0$-$R_5$ in the RMT 122 indicates that the logical register-to-physical register mapping of the logical register $R_0$-$R_5$ is recovered. As an alternative, the RRRC 144 may first determine whether any recovery indicator RCVR is set to "R" in the RMT 122 and, if so, then determine if an instruction 106 allocated to the ROB entry 138(H) resulted in a logical register-to-physical register mapping of a logical register $R_0$-$R_5$ in the RMT 122. In processor state 304, no recovery indicator RCVR is set to "R", meaning that no logical registers in the RMT 122 need to be recovered. Since the RMT recovery is complete, no further entries need to be traversed, and the Write Pointer WR_PTR is moved to point to the ROB entry 138 for the youngest instruction in the ROB, which is the interrupting instruction 106 that was not flushed. This final recovery state is shown in processor state 306. The mapping control circuit 142 in the processor 104 can proceed to allocate new ROB entries 138 for instructions 106 according to the new program flow.

Figure 4B:
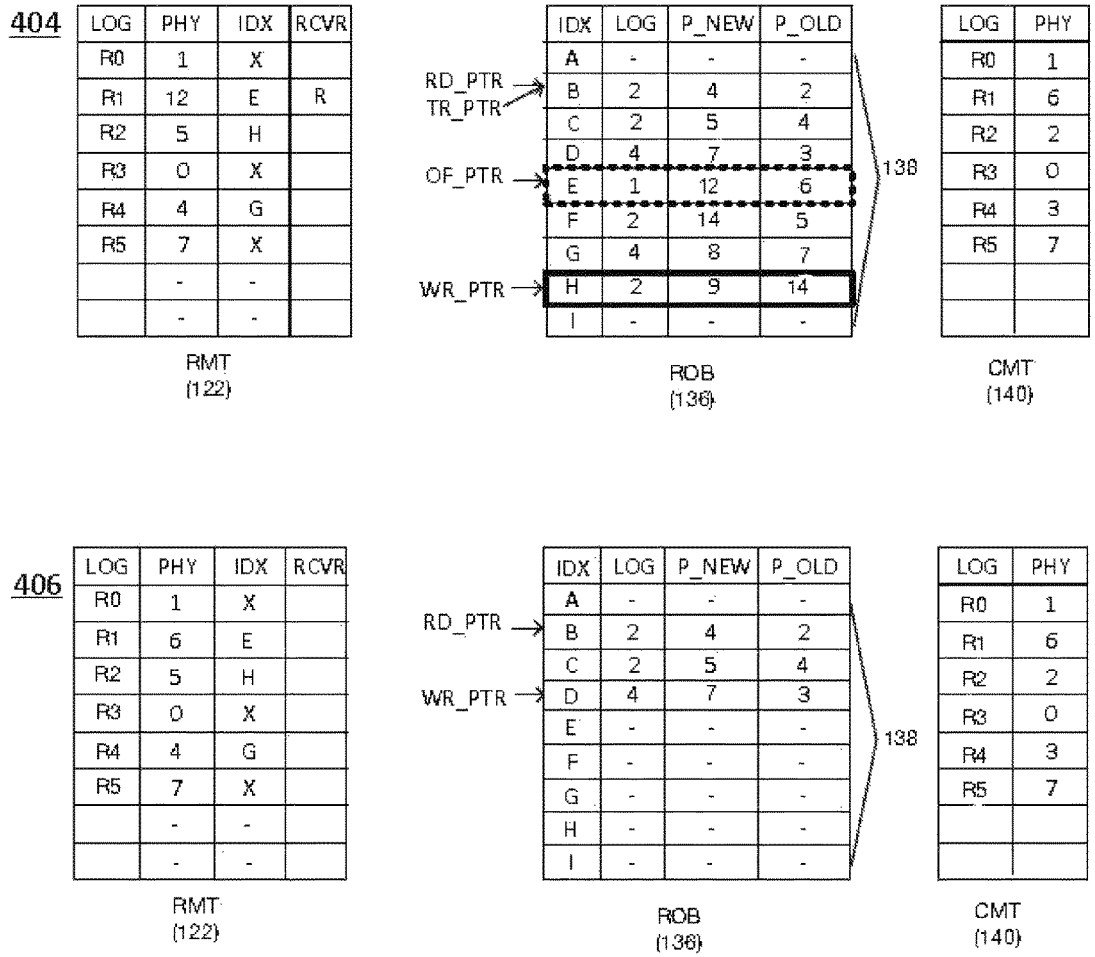

FIGS. 4A and 4B illustrate an exemplary sequence of, in response to a flush indicator 146, traversing the ROB entries 138 in the ROB 136 in the processor 104 of FIG. 1 to recover a previous state of the RMT 122 existing when the interrupting instruction 106, which is to be flushed, entered the instruction processing circuit 100. The example in FIGS. 4A and 4B begins with the same processor state as the example in FIGS. 3A and 3B, but differs because the interrupting instruction 106 in the example in FIGS. 4A and 4B is flushed, whereas the interrupting instruction 106 in the example in FIGS. 3A and 3B was not flushed. The example in FIGS. 4A and 4B also differs from the example in FIGS. 3A and 3B by the direction in which the ROB entries 138 are traversed by the RRRC 144 in the RMT recovery. In FIGS. 4A and 4B, the ROB entries 138 in the ROB 136 are traversed from the position of the interrupting instruction 106 to the position of the oldest instruction associated with the ROB entry 138 indicated by the Read Pointer RD_PTR. Here, the oldest flushed instruction entry OF_PTR points to the ROB entry 138(E), and the traversal pointer TR_PTR points to the ROB entry 138(D), which is the youngest unflushed instruction in processor state 400 and will be the first ROB entry 138 traversed by the RRRC 144 in the RMT recovery.

The RRRC 144 determines that at least one map entry in the RMT 122 is not recovered based on comparing the ROB index associated with each map entry for logical registers $R_0$-$R_5$ in the RMT 122 to the oldest flushed instruction entry OF_PTR. Since the interrupting instruction 106 in ROB entry 138 (E) is flushed in this example, the state of the RMT 122 in processor state 400 differs from the processor state 300 in the example in FIGS. 3A and 3B in that the recovery indicator RCVR for logical register $R_1$ is set to "R" to indicate the logical register $R_1$ needs to be recovered. The recovery indicator RCVR for logical register $R_1$ is set to "R" because the interrupting instruction 106, which is flushed, resulted in a logical register-to-physical register mapping change in logical register $R_1$ in the RMT 122. The RRRC 144 traverses the first instruction entry in the traversal direction in FIG. 4A as described above with regard to FIG. 3A. In particular, in response to receiving the flush indicator 146, the RRRC 144 determines the instruction allocated to ROB entry 138(D) resulted in a logical register-to-physical register mapping in a map entry for logical register $R_4$ in the RMT 122, and recovers the logical register-to-physical register mapping in the map entry of logical register $R_4$ in the RMT 122 to physical register 11, based on the value of the new physical register P_NEW in the ROB entry 138(D). As a result, the logical register $R_4$ is recovered to the state of the map entry for logical register $R_4$ existing when the interrupting instruction 106 entered the processor 104, so the recovery indicator RCVR for logical register $R_4$ can be set to indicate the logical register $R_4$ in the RMT 122 is recovered.

Accordingly, in processor state 402, the recovery indicator RCVR for logical register $R_4$ is no longer set to "R" in the RMT 122, and the traversal pointer TR_PTR has been changed to point to the next ROB entry 138 in the traversing direction in this example (i.e., to ROB entry 138(C)). Before proceeding, the RRRC 144 may check the recovery indicator RCVR for each logical register $R_0$-$R_5$ in the RMT 122 to see if at least one is set to indicate that a mapping in a corresponding map entry needs to be recovered. The RRRC 144 determines whether the instruction allocated to ROB entry 138(C) resulted in a logical register-to-physical register mapping in a map entry of the RMT 122. In response to determining that the instruction allocated to ROB entry 138(C) resulted in a logical register-to-physical register mapping of logical register $R_2$, the RRRC 144 checks the recovery indicator RCVR for logical register $R_2$. In response to the recovery indicator RCVR for logical register $R_2$ indicating that the logical register $R_2$ needs to be recovered, the RRRC 144 recovers the logical register-to-physical register mapping in the map entry of logical register $R_2$ to the physical register 5 based on the new physical register P_NEW value in ROB entry 138(C). This is shown in processor state 404. As a result, the logical register $R_2$ is recovered to the state existing when the interrupting instruction 106 entered the processor 104, and the recovery indicator RCVR can be set to indicate that logical register $R_2$ is recovered.

Finally, proceeding in the traversing direction in the example in FIGS. 4A and 4B, the RRRC 144 determines whether the instruction allocated to ROB entry 138(B) resulted in a logical register-to-physical register mapping in a map entry of the RMT 122. In response to determining that the instruction allocated to ROB entry 138(B) resulted in a logical register-to-physical register mapping of logical register $R_2$, the RRRC 144 checks the recovery indicator RCVR for logical register $R_2$. In response to the recovery indicator RCVR for logical register $R_2$ indicating that the logical register $R_2$ is recovered (as shown in processor state 406), no recovery is performed. Next, the RRRC 144 determines if the instruction in the ROB entry 138(B) is the oldest uncommitted instruction for which an entry was allocated in the ROB 136. ROB entry 138(B) is allocated for the oldest uncommitted instruction, as indicated by the Read Pointer RD_PTR. In response to determining that the instruction in the ROB entry 138(B) is the oldest uncommitted instruction, the RRRC 144 determines if the recovery indicator RCVR for any logical register $R_0$-$R_5$ in the RMT 122 indicates that the logical register-to-physical register mapping in any map entry in the RMT 122 is not recovered. If any recovery indicator RCVR indicates that a map entry for any logical register $R_0$-$R_5$ in the RMT 122 is not recovered, the RRRC 144, for each of the map entries for which the recovery indicator RCVR indicates that the logical register-to-physical register mapping is not recovered, determines a logical register-to-physical register mapping in the CMT 140 for the logical register $R_0$-$R_5$ having a mapping in the (unrecovered) map entry, and sets the logical register-to-physical register mapping in the map entry in the RMT 122 to the logical register-to-physical register mapping for the logical register $R_0$-$R_5$ in the CMT 140.

Restating, when the RRRC 144 receives the flush indicator 146, the recovery indicator RCVR for a logical register $R_0$-$R_5$ in the RMT 122 is set to "R" to indicate that the map entry for the logical register $R_0$-$R_5$ needs to be recovered if the map entry for the logical register $R_0$-$R_5$ was changed as a result of any flushed instruction. However, those logical registers $R_0$-$R_5$ whose map entries were changed by flushed instructions may not have been changed by any of the uncommitted instructions that entered the pipeline before the interrupting instruction 106. As a result, when traversing the ROB entries 138 in the direction in the example in FIGS. 4A and 4B, and the oldest uncommitted instruction is reached, there may still be some logical registers $R_0$-$R_5$ that need to be recovered. To accomplish this, the logical register-to-physical register mapping existing in the CMT 140 for such logical registers $R_0$-$R_5$ is copied to the corresponding map entry in the RMT 122.

This final step of copying map entries from the CMT 140 to the RMT 122 is not needed for traversing the ROB entries 138 in the direction in the example in FIGS. 3A and 3B. Thus, rather than statically setting a direction for the RRRC 144 to traverse the ROB entries 138, in some embodiments disclosed herein, the RRRC 144 is configured to dynamically determine a direction to minimize traversal of the ROB entries in the ROB 136 for recovery of the RMT 122. Examples of dynamically determining the traversal direction are illustrated in FIG. 5.

The starting points for the examples 500A and 500B in FIG. 5 differ from the previous examples in that there is no instruction allocated to the ROB entry 138(H). In 500A, the interrupting instruction 106 is allocated to ROB entry 138(D) and is flushed. Thus, the oldest flushed instruction entry OF_PTR points to the ROB entry 138(D). To dynamically determine a traversal direction, the RRRC 144 determines a traversal direction that appears to minimize the time for traversing the ROB entries 138 to complete the RMT recovery. In some embodiments, the method for minimizing traversal of the ROB entries 138 in the ROB 136 is to compare the number of entries that may be traversed in each direction and select the direction in which traversal would appear to be completed in less time or with fewer entries traversed.

According to the above method, the RRRC 144 determines if a number of survivor ROB entries 138 in the ROB 136 from the instruction entry allocated for the next older instruction than the oldest instruction of the one or more instructions indicated to be flushed, to an oldest entry in the ROB 136 allocated for an oldest uncommitted instruction, is less than a number of flushed ROB entries 138 in the ROB 136 from the oldest flushed instruction entry OF_PTR to a youngest instruction entry in the ROB 136 allocated for a youngest uncommitted instruction.

Referring to the example 500A in FIG. 5, the RRRC 144 compares the number of survivor ROB entries 138 (from ROB entry 138(C) to ROB entry 138(A)) and the number of flushed ROB entries 138 (from the ROB entry 138 (D) to ROB entry 138(G)). In response to determining that the number of survivor ROB entries 138 is less than the number of flushed ROB entries 138, the RRRC 144 traverses the ROB 136 in a first direction from the position of the next older instruction than the oldest instruction of the one or more instructions indicated to be flushed, to an oldest entry in the ROB 136 allocated for an oldest uncommitted instruction (RD_PTR).

Referring to the example 500B in FIG. 5, the interrupting instruction 106 at ROB entry 138(E) is flushed. In this example, the RRRC 144 determines if a number of survivor ROB entries 138 in the ROB 136 from the position of the instruction entry next to the oldest flushed instruction entry OF_PTR to the oldest uncommitted entry (Read Pointer RD_PTR) is less than a number of flushed ROB entries 138 in the ROB 136 from the position of the oldest flushed instruction entry OF_PTR to a ROB entry 138 in the ROB 136 allocated for a youngest uncommitted instruction (Write Pointer WR_PTR).

By the above method, the RRRC 144 would dynamically determine that the number of survivor ROB entries 138 from the ROB entry 138(C) to the ROB entry 138 (A) is not less than the number of ROB flushed entries 138 from the ROB entry 138(D) to the ROB entry 138(G) and, in response, would traverse the ROB 136 in a direction from the position of the instruction entry next to the oldest flushed instruction OF_PTR to the ROB entry 138 allocated for the youngest uncommitted instruction (Read Pointer WR_PTR). If the RRRC 144 determines that the number of survivor ROB entries 138 is not less than the number of flushed ROB entries 138, the RRRC 144 traverses the ROB 136 in the direction from the position of the oldest flushed instruction entry OF_PTR to the ROB entry 138 allocated to the youngest uncommitted instruction (Write Pointer WR_PTR).

In some embodiments, the RRRC 144 traverses the ROB 136 in the processor 104 in the first direction from the position of the oldest flushed instruction entry OF_PTR by traversing the ROB 136 in the processor 104 in the direction from the instruction entry allocated to the next older instruction than the oldest instruction of the one or more instructions indicated to be flushed (i.e., the oldest flushed instruction entry OF_PTR) to the oldest instruction entry.

In some embodiments, the RRRC 144 traverses the ROB 136 in the processor 104 in the first direction from the position of the oldest flushed instruction entry OF_PTR by traversing the ROB 136 in the processor 104 in the first direction from the oldest flushed instruction entry OF_PTR to the youngest instruction entry.

In some embodiments, the RRRC 144 is configured to traverse the ROB 136 in the processor in a second direction from the oldest flushed instruction entry OF_PTR to the youngest instruction entry by being configured to determine if a second instruction allocated to a second instruction entry in the ROB 136 in the second direction resulted in a logical register-to-physical register mapping in a map entry of the RMT 122 in the processor 104. The RRRC 144 is configured to, in response to determining the second instruction allocated for the second instruction entry in the ROB 136 in the second direction resulted in a logical register-to-physical register mapping in a map entry of the RMT 122 in the processor 104, recover the logical register-to-physical register mapping of the map entry in the RMT 122 to a previous logical register-to-physical register mapping prior to the oldest instruction of the one or more instructions indicated to be flushed.

Figure 6:
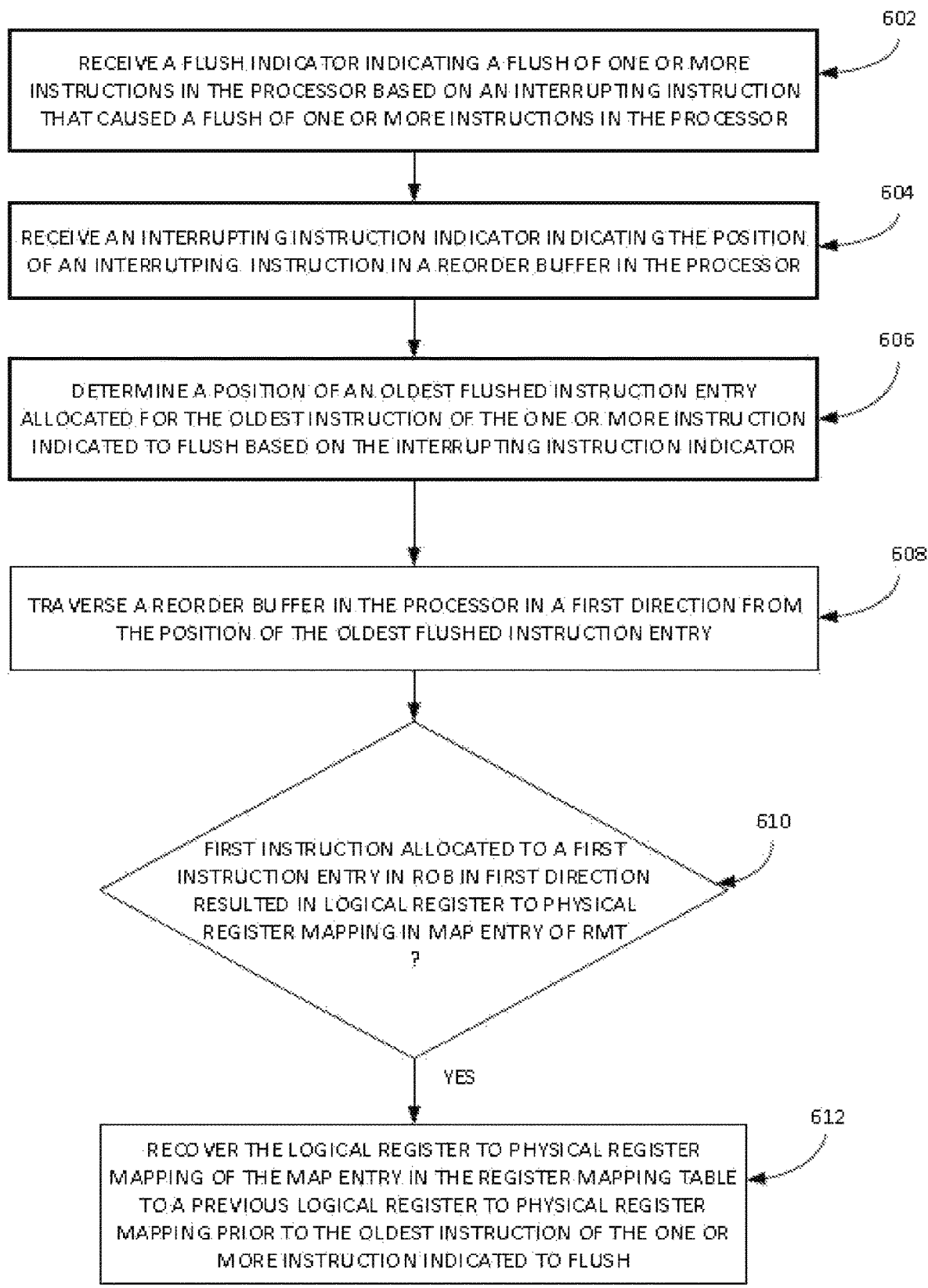
FIG. 6 is a flowchart illustrating an exemplary process of traversing entries in the ROB in the instruction processing circuit of FIG. 1 in a first direction from the position of an interrupting instruction entry to recover the RMT to a previous state.

FIG. 6 is a flowchart illustrating an exemplary process of traversing entries in the ROB in the instruction processing circuit of FIG. 1 in a first direction from the position of an interrupting instruction entry to recover the RMT to a previous state. The method of the register rename recover circuit includes receiving a flush indicator indicating a flush of one or more instructions in the processor based on an interrupting instruction that caused the flush of the one or more instructions in the processor (block 602, FIG. 6), and receiving an interrupting instruction indicator indicating a position of an interrupting instruction entry allocated to the interrupting instruction in a reorder buffer in the processor (block 604, FIG. 6). The method in FIG. 6 further includes determining a position of an oldest flushed instruction entry allocated for an oldest instruction of the one or more instructions indicated to flush based on the interrupting instruction indicator (block 606, FIG. 6), and traversing a reorder buffer in the processor in a first direction from the position of the oldest flushed instruction entry (block 608, FIG. 6). In the method in FIG. 6, the traversing the reorder buffer further includes determining if a first instruction allocated to a first instruction entry in the reorder buffer in the first direction resulted in a logical register-to-physical register mapping in a map entry of a register mapping table in the processor and, in response to determining that the first instruction allocated for the first instruction entry in the reorder buffer in the first direction resulted in a logical register-to-physical register mapping in a map entry of the register mapping table in the processor (decision block 610, FIG. 6), the method further includes recovering the logical register-to-physical register mapping of the map entry in the register mapping table to a previous logical register-to-physical register mapping prior to the oldest instruction of the one or more instructions indicated to flush (block 612, FIG. 6).

Figure 7:
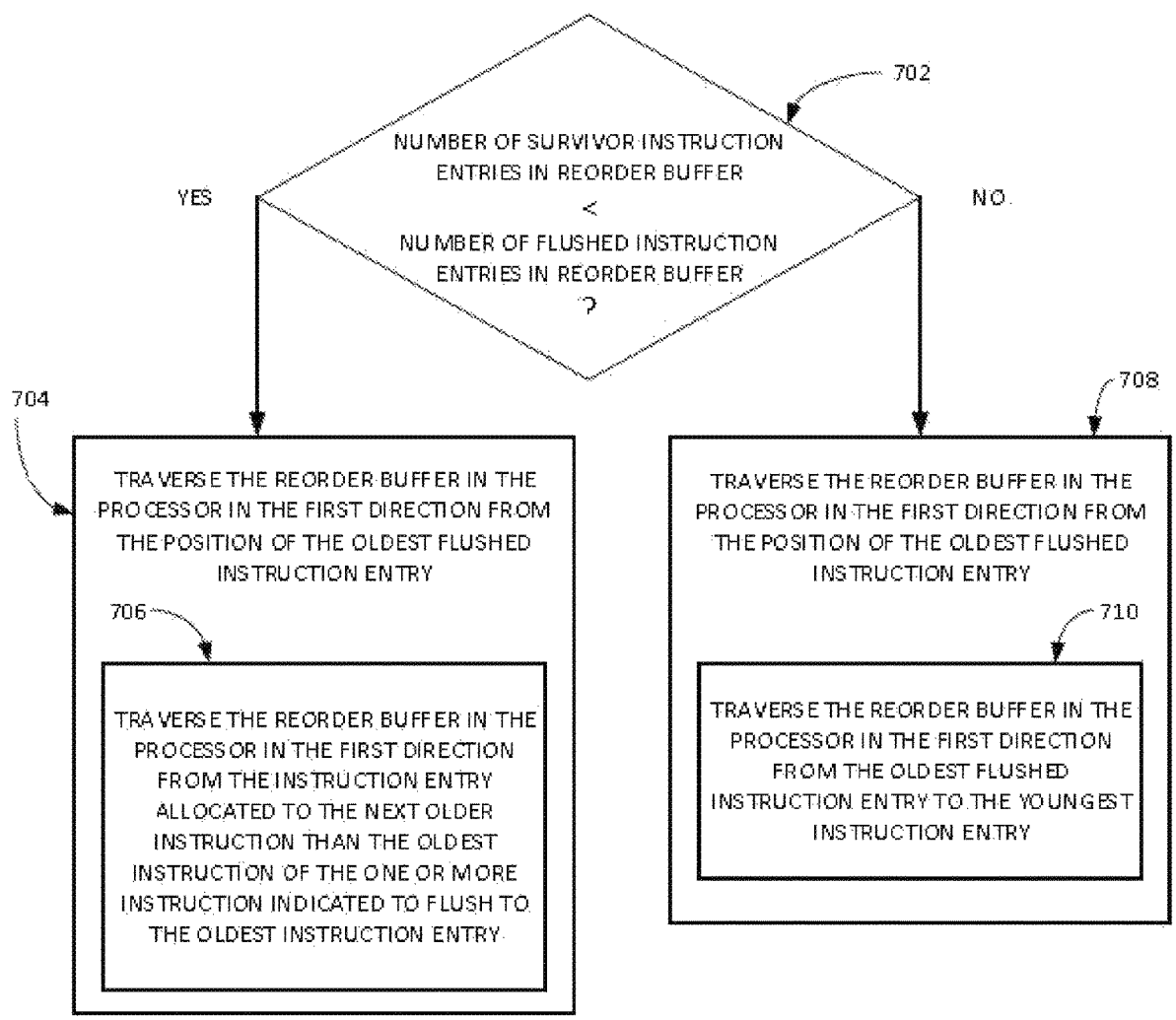
FIG. 7 is a flowchart illustrating an exemplary process of dynamically determining a traversal direction of a ROB to minimize traversal time in a RMT recovery in the processing circuit in FIGS. 1 and 2.

FIG. 7 is a flowchart illustrating an exemplary process of dynamically determining a traversal direction of a ROB to minimize traversal time in a RMT recovery in the processing circuit in FIGS. 1 and 2. The method in FIG. 7 includes the register rename recovery circuit determining if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction, and in response to determining that the number of survivor instruction entries is less than the number of flushed instruction entries (decision block 702, FIG. 7), traversing the reorder buffer in the processor in the first direction from the position of the oldest flushed instruction entry (block 704, FIG. 7), including traversing the reorder buffer in the processor in the first direction from the instruction entry allocated to the next older instruction than the oldest instruction of the one or more instructions indicated to flush to the oldest instruction entry (block 706, FIG. 7). Alternatively, in response to determining that the number of survivor instruction entries is not less than the number of flushed instruction entries (decision block 702, FIG. 7), the method includes traversing the reorder buffer in the processor in the first direction from the position of the oldest flushed instruction entry (block 708, FIG. 7), including traversing the reorder buffer in the processor in the first direction from the oldest flushed instruction entry to the youngest instruction entry (block 710, FIG. 7).

Figure 8:
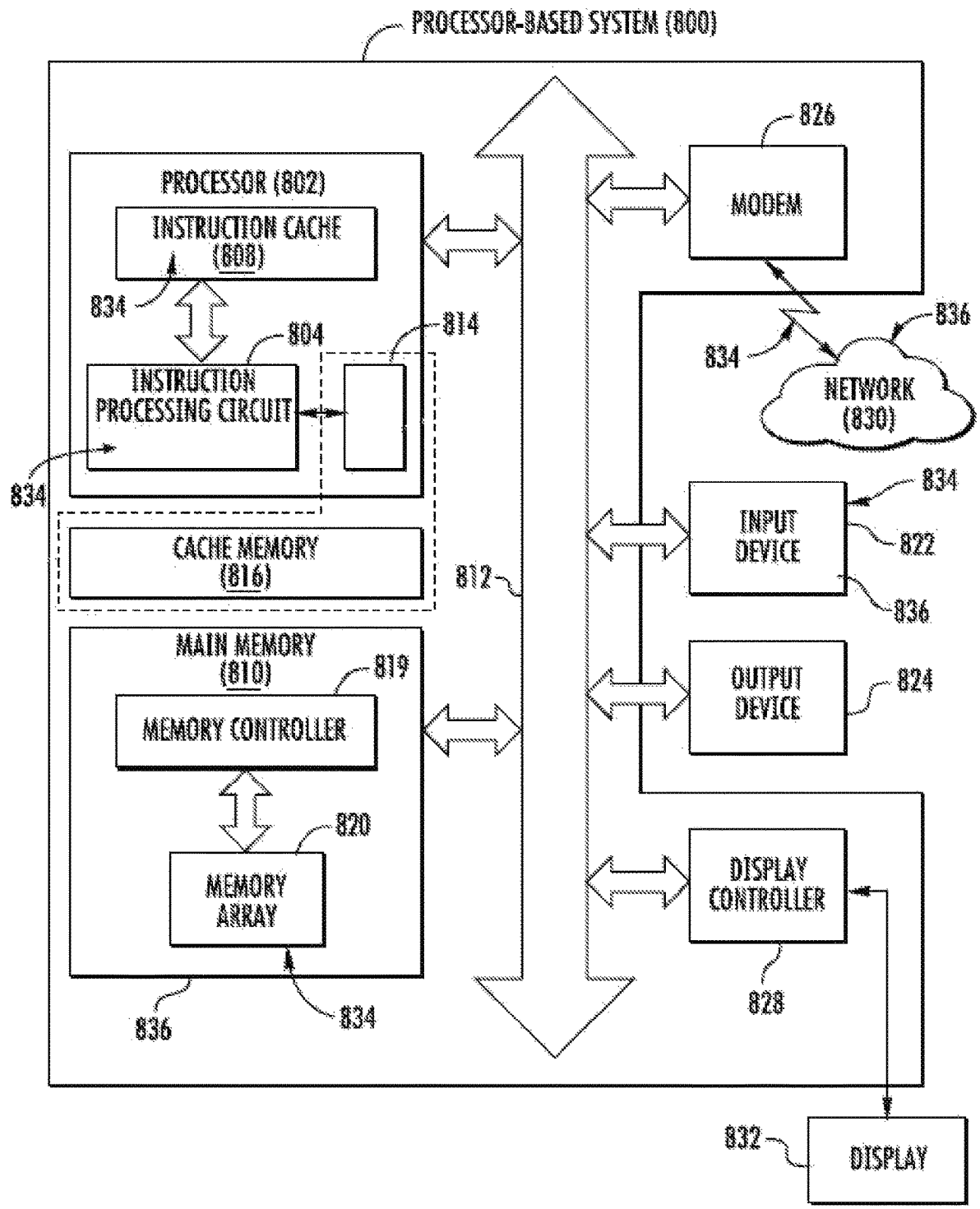
FIG. 8 is a block diagram of an exemplary processor-based system including a processor configured to execute instructions out of order in a pipeline, and a register rename recover circuit (RRRC) configured to minimize traversal time of a ROB in response to an instruction flush, to expedite recovery of a state of the RMT in the processor in FIGS. 1 and 2.

FIG. 8 is a block diagram of an exemplary processor-based system 800 that includes a processor 802 (e.g., a microprocessor) that includes an instruction processing circuit 804. The processor-based system 800 can be the processor-based system 100 in FIG. 1 as an example. The instruction processing circuit 804 can be the instruction processing circuit 100 in FIG. 2 as an example. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 808 for temporary, fast access memory storage of instructions accessible by the instruction processing circuit 804. Fetched or prefetched instructions from a memory, such as from a main memory 810 over a system bus 812, are stored in the instruction cache 808. The instruction processing circuit 804 is configured to process instructions fetched into the instruction cache 808 and process the instructions for execution.

The processor 802 can include a register rename recover circuit 814 to recover a state of a register rename map table in the instruction processing circuit 804 in response to a flush indication indicating a flush of some instruction in an instruction pipeline due to a failed instruction. The processor 804 may be the processor 104 in any of FIGS. 1 and 2, which may be configured to minimize traversal of the reorder buffer in the register rename map table recovery.

The processor 802 and the main memory 810 are coupled to the system bus 812 and can intercouple peripheral devices included in the processor-based system 800. As is well known, the processor 800 communicates with these other devices by exchanging address, control, and data information over the system bus 812. For example, the processor 802 can communicate bus transaction requests to a memory controller 819 in the main memory 810 as an example of a slave device. Although not illustrated in FIG. 8, multiple system buses 812 could be provided, wherein each system bus constitutes a different fabric. In this example, the memory controller 819 is configured to provide memory access requests to a memory array 820 in the main memory 810. The memory array 820 is comprised of an array of storage bit cells for storing data. The main memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the main memory 810, one or more input device(s) 822, one or more output device(s) 824, a modem 826, and one or more display controllers 828, as examples. The input device(s) 822 can include any type of input device, including but not limited to input keys, switches, voice processors, etc. The output device(s) 824 can include any type of output device, including but not limited to audio, video, other visual indicators, etc. The modem 826 can be any device configured to allow exchange of data to and from a network 830. The network 830 can be any type of network, including but not limited to a wired or wireless network, a private or public network, a local area network (LAN), a wireless local area network (WLAN), a wide area network (WAN), a BLUETOOTH™ network, and the Internet. The modem 826 can be configured to support any type of communications protocol desired. The processor 802 may also be configured to access the display controller(s) 828 over the system bus 812 to control information sent to one or more displays 832. The display(s) 832 can include any type of display, including but not limited to a cathode ray tube (CRT), a liquid crystal display (LCD), a plasma display, etc.

The processor-based system 800 in FIG. 8 may include a set of instructions 834 to be executed by the processor 802 for any application desired according to the instructions. The instructions 834 may be stored in the main memory 810, processor 802, and/or instruction cache 808 as examples of a non-transitory computer-readable medium 836. The instructions 834 may also reside, completely or at least partially, within the main memory 810 and/or within the processor 802 during their execution. The instructions 834 may further be transmitted or received over the network 830 via the modem 826, such that the network 830 includes computer-readable medium 836.

While the computer-readable medium 836 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A register renaming recover circuit in a processor configured to:
   receive a flush indicator indicating a flush of one or more instructions in the processor based on an interrupting instruction that caused the flush of the one or more instructions in the processor;
   receive an interrupting instruction indicator indicating a position of an interrupting instruction entry allocated to the interrupting instruction in a reorder buffer in the processor;
   determine a position of an oldest flushed instruction entry allocated for an oldest instruction of the one or more instructions indicated to flush based on the interrupting instruction indicator; and
   traverse the reorder buffer in the processor in a first direction from the position of the oldest flushed instruction entry by being configured to:
      determine if a first instruction allocated to a first instruction entry in the reorder buffer in the first direction resulted in a logical register-to-physical register mapping in a map entry of a register mapping table in the processor; and
      in response to determining the first instruction allocated to the first instruction entry in the reorder buffer in the first direction resulted in a logical register-to-physical register mapping in a map entry of the register mapping table in the processor:
         recover the logical register-to-physical register mapping of the map entry in the register mapping table to a previous logical register-to-physical register mapping prior to the oldest instruction of the one or more instructions indicated to flush.

2. The register renaming recover circuit of claim 1, further configured to:
   determine that at least one map entry in the register mapping table is not recovered based on an index in the at least one map entry in the register mapping table corresponding to an index of an instruction entry in the reorder buffer allocated for the one or more instructions indicated to flush.

3. The register renaming recover circuit of claim 2, further configured to:
   in response to determining that the at least one map entry in the register mapping table is not recovered based on the index in the at least one map entry in the register mapping table corresponding to the index of the instruction entry in the reorder buffer allocated for the one or more instructions indicated to flush:
      for each of the at least one map entry in the register mapping table, set a recovery indicator to indicate that the logical register-to-physical register mapping in the map entry is not recovered.

4. The register renaming recover circuit of claim 3, further configured to:
   determine if a second instruction, allocated for a second instruction entry in the reorder buffer in the first direction, resulted in a logical register-to-physical register mapping in a map entry of the at least one map entry of the register mapping table; and
   in response to determining that the second instruction, allocated for the second instruction entry in the reorder buffer in the first direction, resulted in a logical register-to-physical register mapping in a map entry of the at least one map entry of the register mapping table:
      determine if the recovery indicator for the map entry of the register mapping table indicates that the logical register-to-physical register mapping in the map entry is not recovered; and
      in response to determining that the recovery indicator for the map entry of the register mapping table indicates that the logical register-to-physical register mapping in the map entry is not recovered:
         recover the logical register-to-physical register mapping of the map entry of the register mapping table to the previous logical register-to-physical register mapping prior to the oldest instruction of the one or more instructions indicated to flush; and
         set the recovery indicator to indicate that the logical register-to-physical register mapping in the map entry is recovered.

5. The register renaming recover circuit of claim 2, further configured to:
   in response to recovering the logical register-to-physical register mapping of the map entry in the register mapping table to the previous logical register-to-physical register mapping prior to the oldest instruction of the one or more instructions indicated to flush:
      set a recovery indicator for the map entry for which the logical register-to-physical register mapping is recovered to indicate that the logical register-to-physical register mapping in the map entry is recovered.

6. The register renaming recover circuit of claim 3, further configured to:
   determine if the first instruction is an oldest uncommitted instruction for which an entry was allocated in the reorder buffer in the processor; and
   in response to determining that the first instruction is the oldest uncommitted instruction for which an entry was allocated in the reorder buffer in the processor:
      determine if the recovery indicator for any map entry of the register mapping table indicates that the logical register-to-physical register mapping in any map entry is not recovered; and
      in response to determining that the recovery indicator for any map entry of the register mapping table indicates that the logical register-to-physical register mapping in any map entry is not recovered:
         for each map entry for which the recovery indicator indicates that the logical register-to-physical register mapping is not recovered:
            determine a logical register-to-physical register mapping in a committed map table for a logical register having a mapping in the map entry; and
            set the logical register-to-physical register mapping in the map entry to the logical register-to-physical register mapping for the logical register in the committed map table.

7. The register renaming recover circuit of claim 1, further configured to:
   determine the position of the oldest flushed instruction entry allocated for the oldest instruction of the one or more instructions indicated to flush further based on a type of the interrupting instruction.

8. The register renaming recover circuit of claim 1, further configured to:
   determine if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction;

in response to determining that the number of survivor instruction entries is less than the number of flushed instruction entries:
traverse the reorder buffer in the processor in the first direction from the position of the oldest flushed instruction entry by being configured to:
traverse the reorder buffer in the processor in the first direction from the instruction entry allocated to the next older instruction than the oldest instruction of the one or more instructions indicated to flush to the oldest instruction entry; and in response to determining that the number of survivor instruction entries is not less than the number of flushed instruction entries:
traverse the reorder buffer in the processor in the first direction from the position of the oldest flushed instruction entry by being configured to:
traverse the reorder buffer in the processor in the first direction from the oldest flushed instruction entry to the youngest instruction entry.

9. The register renaming recover circuit of claim 1, further configured to:
traverse the reorder buffer in the processor in the first direction from the position of the oldest flushed instruction entry by being configured to:
traverse the reorder buffer in the processor in the first direction from an instruction entry allocated to a next older instruction than the oldest instruction of the one or more instructions indicated to flush to the oldest instruction entry.

10. The register renaming recover circuit of claim 1, further configured to:
traverse the reorder buffer in the processor in the first direction from the position of the oldest flushed instruction entry by being configured to:
traverse the reorder buffer in the processor in the first direction from the oldest flushed instruction entry to a youngest instruction entry.

11. The register renaming recover circuit of claim 10, further configured to:
traverse the reorder buffer in the processor in a second direction from the oldest flushed instruction entry to the youngest instruction entry by being configured to:
determine if a second instruction allocated to a second instruction entry in the reorder buffer in a second direction resulted in a logical register-to-physical register mapping in a map entry of the register mapping table in the processor; and
in response to determining that the second instruction allocated for the second instruction entry in the reorder buffer in the second direction resulted in a logical register-to-physical register mapping in a map entry of the register mapping table in the processor:
recover the logical register-to-physical register mapping of the map entry in the register mapping table to the previous logical register-to-physical register mapping prior to the oldest instruction of the one or more instructions indicated to flush.

12. A method of a register renaming recover circuit recovering a register rename map table in a processor, comprising:
receiving a flush indicator indicating a flush of one or more instructions in the processor based on an interrupting instruction that caused the flush of the one or more instructions in the processor;
receiving an interrupting instruction indicator indicating a position of an interrupting instruction entry allocated to the interrupting instruction in a reorder buffer in the processor;
determining a position of an oldest flushed instruction entry allocated for an oldest instruction of the one or more instructions indicated to flush based on the interrupting instruction indicator; and
traversing the reorder buffer in the processor in a first direction from the position of the oldest flushed instruction entry further comprising:
determining if a first instruction allocated to a first instruction entry in the reorder buffer in the first direction resulted in a logical register-to-physical register mapping in a map entry of a register mapping table in the processor; and
in response to determining that the first instruction allocated for the first instruction entry in the reorder buffer in the first direction resulted in a logical register-to-physical register mapping in a map entry of the register mapping table in the processor:
recovering the logical register-to-physical register mapping of the map entry in the register mapping table to a previous logical register-to-physical register mapping prior to the oldest instruction of the one or more instructions indicated to flush.

13. The method of claim 12, further comprising:
determining that at least one map entry in the register mapping table is not recovered based on an index in the at least one map entry in the register mapping table corresponding to an index of an instruction entry in the reorder buffer allocated for the one or more instructions indicated to flush.

14. The method of claim 13, further comprising:
in response to determining that the at least one map entry in the register mapping table is not recovered based on the index in the at least one map entry in the register mapping table corresponding to the index of the instruction entry in the reorder buffer allocated for the one or more instructions indicated to flush:
for each of the at least one map entry in the register mapping table, setting a recovery indicator to indicate that the logical register-to-physical register mapping in the map entry is not recovered.

15. The method of claim 14, further comprising:
determining if a second instruction, allocated for a second instruction entry in the reorder buffer in the first direction, resulted in a logical register-to-physical register mapping in a map entry of the at least one map entry of the register mapping table; and
in response to determining that the second instruction, allocated for the second instruction entry in the reorder buffer in the first direction, resulted in a logical register-to-physical register mapping in a map entry of the at least one map entry of the register mapping table:
determining if the recovery indicator for the map entry of the register mapping table indicates that the logical register-to-physical register mapping in the map entry is not recovered; and in response to determining that the recovery indicator for the map entry of the register mapping table indicates that the logical register-to-physical register mapping in the map entry is not recovered:
recovering the logical register-to-physical register mapping of the map entry of the register mapping table to the previous logical register-to-physical register mapping prior to the oldest instruction of the one or more instructions indicated to flush; and
setting the recovery indicator to indicate that the logical register-to-physical register mapping in the map entry is recovered.

16. The method of claim 14, further comprising:
determining if the first instruction is an oldest uncommitted instruction for which an entry was allocated in the reorder buffer in the processor; and
in response to determining that the first instruction is the oldest uncommitted instruction for which an entry was allocated in the reorder buffer in the processor:
determining if the recovery indicator for any map entry of the register mapping table indicates that the logical register-to-physical register mapping in any map entry is not recovered; and
in response to determining that the recovery indicator for any map entry of the register mapping table indicates that the logical register-to-physical register mapping in any map entry is not recovered:
for each map entry for which the recovery indicator indicates that the logical register-to-physical register mapping is not recovered:
determining a logical register-to-physical register mapping in a committed map table for s logical register having a mapping in the map entry; and
setting the logical register-to-physical register mapping in the map entry to the logical register-to-physical register mapping for the logical register in the committed map table.

17. The method of claim 13, further comprising:
in response to recovering the logical register-to-physical register mapping of the map entry in the register mapping table to the previous logical register-to-physical register mapping prior to the oldest instruction of the one or more instructions indicated to flush:
setting a recovery indicator for the map entry for which the logical register-to-physical register mapping is recovered to indicate that the logical register-to-physical register mapping in the map entry is recovered.

18. The method of claim 12, further comprising:
determining the position of the oldest flushed instruction entry allocated for the oldest instruction of the one or more instructions indicated to flush further based on a type of the interrupting instruction.

19. The method of claim 12, further comprising:
determining if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction;
in response to determining that the number of survivor instruction entries is less than the number of flushed instruction entries:
traversing the reorder buffer in the processor in the first direction from the position of the oldest flushed instruction entry, further comprising:
traversing the reorder buffer in the processor in the first direction from the instruction entry allocated to the next older instruction than the oldest instruction of the one or more instructions indicated to flush to the oldest instruction entry; and
in response to determining that the number of survivor instruction entries is not less than the number of flushed instruction entries:
traversing the reorder buffer in the processor in the first direction from the position of the oldest flushed instruction entry, further comprising:
traversing the reorder buffer in the processor in the first direction from the oldest flushed instruction entry to the youngest instruction entry.

20. The method of claim 12, wherein:
traversing the reorder buffer in the processor in the first direction from the position of the oldest flushed instruction entry further comprises:
traversing the reorder buffer in the processor in the first direction from an instruction entry allocated to a next older instruction than the oldest instruction of the one or more instructions indicated to flush to the oldest instruction entry.

21. The method of claim 12, wherein:
traversing the reorder buffer in the processor in the first direction from the position of the oldest flushed instruction entry further comprises:
traversing the reorder buffer in the processor in the first direction from the oldest flushed instruction entry to a youngest instruction entry.

22. The register renaming recover circuit of claim 21, further comprising:
traversing the reorder buffer in the processor in a second direction from the oldest flushed instruction entry to the youngest instruction entry, further comprising:
determining if a second instruction allocated to a second instruction entry in the reorder buffer in the second direction resulted in a logical register-to-physical register mapping in a map entry of the register mapping table in the processor; and
in response to determining that the second instruction allocated for the second instruction entry in the reorder buffer in the second direction resulted in a logical register-to-physical register mapping in a map entry of the register mapping table in the processor:
recovering the logical register-to-physical register mapping of the map entry in the register mapping table to the previous logical register-to-physical register mapping prior to the oldest instruction of the one or more instructions indicated to flush.

23. A register renaming recover circuit in a processor configured to:
receive a flush indicator indicating a flush of one or more instructions in the processor based on an interrupting instruction that caused the flush of the one or more instructions in the processor;
receive an interrupting instruction indicator indicating a position of an interrupting instruction entry allocated to the interrupting instruction in a reorder buffer in the processor;

determine a position of an oldest flushed instruction entry allocated for an oldest instruction of the one or more instructions indicated to flush based on the interrupting instruction indicator;

determine if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction;

in response to determining that the number of survivor instruction entries is less than the number of flushed instruction entries:

traverse the reorder buffer in the processor in a first direction from the oldest instruction entry to the instruction entry allocated to the next older instruction than the oldest instruction of the one or more instructions indicated to flush; and in response to determining that the number of survivor instruction entries is not less than the number of flushed instruction entries:

traverse the reorder buffer in the processor in the first direction from the youngest instruction entry to the oldest flushed instruction entry.

24. The register renaming recover circuit of claim 23, further configured to:

in response to determining that the number of survivor instruction entries is not less than the number of flushed instruction entries:

traverse the reorder buffer in the processor in a second direction from the youngest instruction entry to the oldest flushed instruction entry; and in response to determining that the number of survivor instruction entries is less than the number of flushed instruction entries:

traverse the reorder buffer in the processor in the second direction from the oldest instruction entry to the instruction entry allocated to the next older instruction than the oldest instruction of the one or more instructions indicated to flush.

25. A method of a register renaming recover circuit recovering a register rename map table in a processor, comprising:

receiving a flush indicator indicating a flush of one or more instructions in the processor based on an interrupting instruction that caused the flush of the one or more instructions in the processor;

receiving an interrupting instruction indicator indicating a position of an interrupting instruction entry allocated to the interrupting instruction in a reorder buffer in the processor;

determining a position of an oldest flushed instruction entry allocated for an oldest instruction of the one or more instructions indicated to flush based on the interrupting instruction indicator;

determining if a number of survivor instruction entries in the reorder buffer from an instruction entry allocated for a next older instruction than the oldest instruction of the one or more instructions indicated to flush to an oldest instruction entry in the reorder buffer allocated for an oldest uncommitted instruction is less than a number of flushed instruction entries in the reorder buffer from the oldest flushed instruction entry to a youngest instruction entry in the reorder buffer allocated for a youngest uncommitted instruction;

in response to determining that the number of survivor instruction entries is less than the number of flushed instruction entries:

traversing the reorder buffer in the processor in a first direction from the oldest instruction entry to the instruction entry allocated to the next older instruction than the oldest instruction of the one or more instructions indicated to flush; and in response to determining that the number of survivor instruction entries is not less than the number of flushed instruction entries:

traversing the reorder buffer in the processor in the first direction from the youngest instruction entry to the oldest flushed instruction entry.

26. The method of claim 25, further comprising:

in response to determining that the number of survivor instruction entries is not less than the number of flushed instruction entries:

traversing the reorder buffer in the processor in a second direction from the youngest instruction entry to the oldest flushed instruction entry.

* * * * *